(12) United States Patent
Broeng et al.

(10) Patent No.: US 7,349,611 B2
(45) Date of Patent: Mar. 25, 2008

(54) PHOTONIC BANDGAP FIBRE, AND USE THEREOF

(75) Inventors: Jes Broeng, Birkerod (DK); Stig Eigil Barkou Libori, Soborg (DK); Anders Bjarklev, Roskilde (DK)

(73) Assignee: Crystal Fibre A/S, Birkerod (DK)

(*) Notice: Subject to any disclaimer, the term of this patent is extended or adjusted under 35 U.S.C. 154(b) by 40 days.

(21) Appl. No.: 10/479,864

(22) PCT Filed: Jun. 7, 2002

(86) PCT No.: PCT/DK02/00390

§ 371 (c)(1),
(2), (4) Date: Apr. 22, 2004

(87) PCT Pub. No.: WO02/101429

PCT Pub. Date: Dec. 19, 2002

(65) Prior Publication Data

US 2004/0175084 A1    Sep. 9, 2004

(30) Foreign Application Priority Data

Jun. 8, 2001   (DK) .............................. 2001 00897

(51) Int. Cl.
*G02B 6/00* (2006.01)
*G02B 6/02* (2006.01)
*G02B 6/32* (2006.01)

(52) U.S. Cl. ...................... 385/125; 385/126; 385/127; 385/144

(58) Field of Classification Search ................ 385/123, 385/125–128, 144
See application file for complete search history.

(56) References Cited

U.S. PATENT DOCUMENTS

| 5,155,792 A | 10/1992 | Vali et al. ................... 385/125 |
| 5,471,553 A | 11/1995 | Teshima ..................... 385/125 |
| 5,802,236 A | 9/1998 | DiGiovanni et al. ........ 385/127 |
| 5,907,652 A | 5/1999 | DiGiovanni et al. ........ 385/125 |
| 6,154,594 A * | 11/2000 | Fiacco et al. ............... 385/126 |
| 6,404,966 B1 * | 6/2002 | Kawanishi et al. ......... 385/125 |
| 6,539,155 B1 * | 3/2003 | Broeng et al. .............. 385/125 |
| 6,892,018 B2 * | 5/2005 | Libori et al. ................ 385/127 |

FOREIGN PATENT DOCUMENTS

EP    1 148 360    10/2001

(Continued)

OTHER PUBLICATIONS

Russell et al., "Photonic Crystal Fibers", Sep. 1997, Conference Publication No. 448, pp. 63-64.*

(Continued)

*Primary Examiner*—Sung Pak
*Assistant Examiner*—Daniel J Petkovsek
(74) *Attorney, Agent, or Firm*—Jacobson Holman PLLC

(57) ABSTRACT

A mircrostructured optical fiber that guides light in a core region, where the fiber has a cladding region that includes a background material and a number of cladding features or elements that are elongated in the longitudinal direction of the fiber and have a higher refractive index than the cladding background material. The core region has a lower effective refractive index than the cladding, and the fiber may guide light in the core by photonic bandgap effects.

45 Claims, 22 Drawing Sheets

FOREIGN PATENT DOCUMENTS

| | | |
|---|---|---|
| JP | 56-006202 | 1/1981 |
| JP | 57-041602 | 3/1982 |
| JP | 59-217632 | 12/1984 |
| JP | 08-119656 | 5/1996 |
| WO | 99/64903 | 12/1999 |
| WO | 99/64904 | 12/1999 |
| WO | 00/60388 | 10/2000 |
| WO | 02/26648 | 4/2002 |

OTHER PUBLICATIONS

Birks, et al., "Full 2-D Photonic Bandgaps in Silica/Air Structures," Electronic Letters, vol. 31, No. 22, pp. 1941-1943 (1995).

Knight, et al., "Properties of Photonic Crystal Fiber and the Effective Index Model," J. Opt. Soc. Am. A, vol. 15, No. 3, pp. 748-752 (1998).

Mogilevtsev, et al., "Group-Velocity Dispersion in Photonic Crystal Fibers," Optics Letters, vol. 23, No. 21, pp. 1662-1664 (1998).

Knight, et al., "Photonic Band Gap Guidance in Optical Fibers," Science, vol. 282, pp. 1476-1478 (1998).

Broeng, et al., "Waveguidance by the Photonic Bandgap Effect in Optical Fibres," Pure Appl. Optics 1, pp. 477-482 (1999).

Broeng, et al., "Photonic Crystal Fibers: A New Class of Optical Waveguides," Optical Fiber Technology, vol. 5, pp. 305-330 (1999).

Cregan, et al., "Single-Mode Photonic Band Gap Guidance of Light in Air," Science, vol. 285, pp. 1537-1539 (1999).

Broderick, et al. "Nonlinearity in Holey Optical Fibers: Measurement and Future Opportunities," Optics Letters, vol. 24, No. 20, pp. 1395-1397 (1999).

Ranka, et al., "Visible Continuum Generation in Air-Silica Microstructure Optical Fibers with Anomalous Dispersion at 800 nm," Optics Letters, vol. 25, No. 1, pp. 25-27, (2000).

Broeng, et al., "Analysis of Air-Guiding Photonic Bandgap Fibers," Optics Letters, vol. 25, No. 2, pp. 96-98 (2000).

Monro, et al., "Holey Fibers with Random Cladding Distributions," Optics Letters, vol. 25, No. 4, pp. 206-208 (2000).

West, et al., "Demonstration of an IR-Optimized Air-Core Photonic Band-Gap Fiber," European Conference on Optical Communication Amsterdam, pp. 41-42 (2000).

Bise, et al. "In Optical Fiber Communication Conference," paper ThK3, pp. 466-468 (2002).

* cited by examiner

PHOTONIC BANDGAP FIBRE, AND USE THEREOF

This is a nationalization of PCT/DK02/00390 filed Jun. 7, 2002 and published in English.

FIELD OF THE INVENTION

The present invention relates to optical fibres that operate by photonic bandgap effects. The invention provides a new range of photonic bandgap (PBG) guiding optical fibres that comprise periodically arranged high-index cladding features and a core region with a lower effective refractive index than the refractive index of the cladding features. The present invention provides photonic bandgap fibres that may operate without the use of voids in the cladding, thereby simplifying fabrication of photonic bandgap fibres compared to prior art. The invention further provides photonic bandgap fibres with tuneable waveguiding properties, such as tuneable dispersion and tuneable polarization. The new fibres have a number of potential applications mainly in the field of fibre optical communication systems.

BACKGROUND OF THE INVENTION

Within the past few years, a significant research interest has been pointed towards optical fibres that incorporate microstructured features in the fibre cross-section. Optical fibres of this type are referred to by several names—microstructured fibres, photonic crystal fibres, holey fibres, photonic bandgap fibres, and hole-assisted fibres. The reason for the large interest in these fibres is the new possibilities that they offer in areas such as optical telecommunications, sensors, spectroscopy, light sources and medicine (see e.g. WO 99/64903, WO 99/64904, Broeng et al. Pure and Applied Optics, pp.477-482, 1999, Knight et al. J. Opt. Soc. Am. A, Vol. 15, No. 3, pp. 748-752, 1998, U.S. Pat. No. 5,802,236, Monro et al. Optics Letters, Vol.25 (4), p.206-8, Feb. 2000, Ranka et al., Optics Letters, Vol. 25, No. 1, pp.25-27, 2000, Broderick et al. Optics Letters, Vol. 24, No. 20, pp. 1395-1397, 1999, Mogilevtsev et al. Optics Letters, Vol. 23, No. 21, pp. 1662-1664, 1998).

Microstructured fibres are generally divided into two main categories: index-guiding and photonic bandgap (PBG) guiding optical fibres. In short, index-guiding microstructured fibres are characterized by a high index core and a low index cladding—the cladding comprises microstructured cladding features that act to lower the effective, refractive index of the cladding compared to the refractive index of the core. PBG fibres, on the other hand, are characterized by a low index core and periodically arranged cladding features that provide an out-of-plane two dimensional photonic bandgap capable of confining light in the low-index core.

The separation between the two categories of microstructured fibres is well understood in the scientific community and both categories have been well described in a number of references; such as Birks et al., Electronics Letters, Vol.31 (22), p.1941, Oct. 1995, WO 99/64903, WO 99/64904, Broeng et al. Pure and Applied Optics, pp.477-482, 1999, Broeng et al. Optics Letters 25: (2), pp.96-98, 2000, Cregan et al. Science 285: (5433) pp. 1537-1539, 1999 describing fibres operating by PBG effects—and U.S. Pat. No. 5,802, 236, Knight et al. J. Opt. Soc. Am. A, Vol. 15, No. 3, pp. 748-752, 1998, Monro et al. Optics Letters, Vol.25 (4), p.206-8, February 2000 defining fibres where the light is transmitted using index guidance—also referred to as modified Total Internal Reflection (TIR).

The present patent application addresses PBG fibres—that is fibres with periodically arranged cladding features and a low-index core.

In order to realise photonic bandgap effects in more than one dimension, it is generally believed that materials having relative large index differences must be employed.

As known to those skilled in the art, a minimum refractive index contrast of around 1.0 to 2.6 is required for in-plane two-dimensional (2D) PBG effects to take place. Hence, materials such as air (with a refractive index of 1.0) and silica (with a refractive index of 1.45) do not provide sufficient refractive index contrast to provide in-plane 2D PBG effects. In 1995, however, Birks et al., (see Electronics Letters, Vol.31 (22), p.1941, Oct. 1995) realized that air-silica structures may exhibit 2D PBGs in the case where light is travelling with a certain angle with respect to the 2D plane of periodicity—the so called out-of-plane case.

Birks et al. used this knowledge to propose PBG fibres that would be able to confine light in a low-index core (for example a hollow core) using a cladding structure having a background material of silica and air holes as periodic features. In the above-mentioned reference Birks et al. teaches that high-index rods in a background material may also provide out-of-plane 2D PBGS, but that such structures are practically impossible to use since solid rods of silica surrounded by air may not be supported robustly in form of optical fibres. Hence, it is read that Birks et al. do not consider high-index features to be of practically relevance for PBG fibres. This teaching by Birks et al. that out-of-plane 2D PBG requires a significant refractive index contrast and that only low-index features are of interest is further underline by later studies of PBG optical fibres (see above-mentioned list of PBG fibre references) that all addresses air holes disposed periodically in a high index backgound material (typically silica). Hence, in the prior art of PBG fibres it is taught that a refractive index contrast of around 1.0 to 1.45 is required in order to provide 2D PBG that may be used in optical fibres.

The present inventors have, however, realized that structures with significantly lower index contrast than that of air to silica may provide PBG effects that may be utilized for realizing a novel range of PBG fibres.

The present inventors have realized that low-index contrast structures may, in fact, exhibit useful PBGs in exactly the opposite case of that taught in the prior art—namely, in the case of low-contrast structures having high-index features disposed in a background material with a slightly lower refractive index. In particular, the present inventors have realized that high-index features with a refractive index of around 1.46 disposed in a background material with a refractive index of around of around 1.45 may provide broadband PBGs that can be utilized for PBG fibres. Hence, new PBG fibres realized purely using silica and silica incorporating various dopants become feasible using the present invention, as shall be demonstrated throughout the detailed description.

The low-contrast structures for use in new PBG fibres as disclosed in the present invention have a number of further advantages. At present, very few experimental studies of PBG fibres have been performed (Knight et al., Science, Vol.282 (5393), p. 1476, Nov. 1998, Cregan et al. Science 285: (5433) pp. 1537-1539, 1999 and West et al. European Conference on Optical Communication, Amsterdam, pp. 41-42, 2000). One of the main reasons to the few number of experimental studies is related to difficulties in fabricating PBG fibres. In particular, the fabrication of prior art PBG fibres is hindered by the difficulties in accurately controlling voids (typically air holes) in the fibres. These difficulties concern the high demands for longitudinal uniformity of the fibres, a sufficient number of periods surrounding the core, high uniformity in the periodic arrangement of the cladding features, as well as very precise dimensioning of these cladding features. At present, the above-mentioned requirements have proven difficult to meet for PBG fibre lengths of more than 50 metres. The fibre drawing conditions, such as temperature, drawing speed and pressure inside the voids, must all be controlled very accurately in order to obtain predetermined void dimensions and avoid collapsing or expanding (exploding) of the voids.

It should be noticed that due to the high-index core, index guiding microstructured fibres have much lower fabrication requirements—and in fact randomly distributed cladding features may be sufficient to provide waveguidance in such fibres (see e.g. Monro et al. Optics Letters, 25 (4), pp. 206-8, 2000)—this is not the case for PBG fibres.

It is a disadvantage of prior art PBG fibres incorporating voids that the voids and thereby the waveguiding properties of the PBG fibres are difficult to control during fabrication.

It is an object of the present invention to provide PBG fibres that are more simple to fabricate compared to PBG fibres comprising voids.

For compatibility with conventional, silica-based optical fibre technology, it is a disadvantage that prior art, silica-based PBG fibres comprise voids.

It is a further object of the present invention to provide PBG fibres that do not comprise any voids or low-index features at all. In particular, it is an object of the present invention to provide PBG fibres that may be realised solely from silica-based materials. Such as to provide PBG guiding fibres that may be fabricate using index contrasts that are feasible within silica technology (for example using Ge, Al, F and/or other dopants that may be incorporated into silica).

Although mainly void-type of cladding features have been studied in the prior art PBG fibres, other cladding features with a low refractive index may provide PBG effect in order to confine light in a low-index core.

However, for all prior art PBG fibres, the core region comprises material that has a lower refractive index than the cladding background material.

The low-index features (typically voids) in the core of prior art PBG fibres may result in problems such as mode mismatch between the guided mode of a PBG fibre and the guided mode of a conventional silica optical fibre, coupling losses due to reflections between the interface of two such fibres, and splicing difficulties for PBG fibres due to collapsing or expanding voids. It is, therefore, a further disadvantage of prior art PBG fibres that the core region comprises material with a refractive index lower than that of the cladding background material. In particular, it is a disadvantage of prior art PBG fibres that the core region comprises voids.

It is an object of the present invention to provide PBG fibres where the core comprises material that do not have a refractive index being lower than the refractive index of the cladding background material.

It is a further disadvantage of prior art PBG fibres comprising voids that the large refractive index difference between the core/cladding features and the background material results in a high sensitive towards minor structural inaccuracies for certain fibre properties. For example, polarization effects, such as birefringence, are very difficult to eliminate in prior art PBG fibres due to the high index contrast between the constituting materials of the fibre. As a result of this, prior art PBG fibres may exhibit large polarization mode dispersion (PMD) that cannot be tolerated for optical transmission fibres operating at high bit rates, such as at 10 Gbit/s or higher.

It is a further object of the present invention to provide PBG fibres that have small index contrast between the constituting materials in order to eliminate degrading effects such as PMD.

It is a further object of the present invention to provide a new class of photonic bandgap fibre.

It is a further object of the present invention to provide optical fibre that may be used in optical communication systems. In particular, it is an object of the present invention to provide optical fibres with anomalous dispersion for relatively larger core sizes. Such fibres may be used for dispersion compensation or as transmission fibres where the relatively large core may reduce degrading effets, such as non-linear effects.

It is a further object of the present invention to provide a new class of photonic bandgap fibre where the optical properties, such as dispersion, may be tune or trimmed during operation of the fibre.

SUMMARY OF THE INVENTION

According to a first aspect of the invention there is provided a micro-structured optical fibre, said optical fibre having an axial direction and a cross-section perpendicular to said axial direction, said optical fibre comprising: a core region, and a cladding region surrounding said core region. The cladding region comprises a low-index cladding background material with periodically or substantially periodically arranged spaced apart high-index cladding features having a higher refractive index than the refractive index of the cladding background material. Here, the periodically or substantially periodically arranged high-index cladding features are periodically or substantially periodically arranged in the cross-section of the fibre. It is preferred that the high-index cladding features are elongated in the fibre axial direction.

Preferably, the micro-structured optical fibre is designed for guiding light at an operating wavelength or a predetermined wavelength, and it is also within a preferred embodiment that the optical fibre is designed for guiding light as a Photonic Bandgap Fibre.

In a preferred embodiment the core region has an effective refractive index, which is lower than the refractive index of the high-index cladding features at the operating or predetermined wavelength. It is also within a preferred embodiment that the core region has an effective refractive index being lower than an effective refractive index of the cladding region at the operating or predetermined wavelength.

According to a second aspect of the invention there is provided a micro-structured optical fibre for transmitting at least a predetermined wavelength of light, said optical fibre having an axial direction and a cross section perpendicular to said axial direction. The fibre of the second aspect of the invention comprises a core region and a cladding region surrounding the core region. In the cross-section of the fibre, the cladding region is characterized by a multitude of cladding features. Spatially, these features are isolated from each other and hey are positioned in a substantially periodic arrangement. The fibre is characterized in that: All features in the cladding have a higher refractive index than the refractive index of the cladding background material, and the effective refractive of the cladding is higher than the effective refractive index of the core at the predetermined wavelength.

According to a further aspect of the present invention, the invention may be embedded in an article (which e.g., can be used in an optical fibre communication system) that comprises a micro-structured optical fibre according to an embodiment of the present invention for guiding light at a predetermined wavelength.

In a preferred embodiment of the fibres of the invention, the high-index cladding features may comprise doped silica.

According to an embodiment of the fibres of the present invention, the core region may be made of a solid material, which may be identical to the cladding background material. However, it is also within a preferred embodiment that the core region has a predetermined refractive index profile.

In a preferred embodiment of the fibres of the invention, the core region may comprise a material having a refractive index being lower than the refractive index of the high-index cladding features and higher than or equal to the refractive index of the low-index cladding background material.

It is also within an embodiment of the fibres of the invention that the core region is homogeneous.

The present invention also covers embodiments in which the core region comprises spatially isolated features, which may be elongated in the fibre axial direction.

In a preferred embodiment, the fibres according to the aspects of the present invention may comprise solely silica and silica dopants. Thus, for the fibres of the present invention it is preferred that the fabrication of a fibre comprises stacking of doped silica rods.

For the fibres of present invention it is preferred that the difference in the refractive index of the high index cladding features and the low-index cladding background material is rather small. Thus, it is preferred that the difference in the refractive index of the high index cladding features and the low-index cladding background material is equal to or lower than 5%, equal to or lower than 4%, equal to or lower than 3%, equal to or lower than 2%, equal to or lower than 1%, or equal to or lower than 0.5% of the refractive index of the high-index cladding features. According to an embodiment of the fibres of the invention it is preferred that the fibre comprises solely materials having refractive indices in the range from 1.43 to 1.48, such as in the range from 1.44 to 1.47, or such as in the range from 1.44 to 1.46.

In a preferred embodiment of the fibres of the present invention, the cladding features have a spacing larger than the predetermined or operating wavelength. It is also preferred that the periodic or substantially periodic cladding structure has a pitch larger than the predetermined wavelength.

In a preferred embodiment, the core may comprise co-dopants that provide a predetermined refractive index profile of the core. In a preferred embodiment, the predetermined index profile may have a maximum in the centre of the core, such as a parabolic index profile, a W-profile, or another profile known from conventional optical fibres. In another preferred embodiment, the predetermined index profile may have a local minimum in centre of the core—such as a local minima that may result from fabrication of doped rods using modified chemical vapour deposition (MCVD).

In another preferred embodiment of the fibres of the invention, the core may comprise at least one isolated feature having a refractive index, Nco,1, that is different from the refractive index of any material adjacent to the core feature.

According to an embodiment of the fibres of the invention, a centre-to-centre spacing of nearest cladding features may be larger than said predetermined wavelength or the operating wavelength of guided light, such as larger than 2 times than said predetermined or operating wavelength, such as larger than 5 times than said predetermined or operating wavelength.

In preferred embodiments of the fibres of the invention, the cladding features are, in the cross-section, arranged in a close-packing arrangement, which provides intrinsically the largest filling fraction of the features.

Other arrangements—such as honeycomb, Kagome and quadratic arrangements—may be preferred for specific applications. Such arrangements are covered by other preferred embodiments of the present invention.

The fibres disclosed in the present invention are intended for use in a wide range of applications, where the light guided through the fibre may be in the range from 0.3 µm to 21 m. For use in certain systems, the predetermined wavelength will be very short —typically in the interval from 0.3 µm to 0.6 µm. For other applications, the fibre may be desired for delivery of light from laser sources such as III-V semiconductor lasers—with a wavelength range from around 0.6 µm to 1.2 µm. Particularly, the wavelength may be in the range around 0.8 µm, which is of interest for delivery of light from relatively cheap GaAs based semiconductor lasers. For other applications, fibres according to the present invention may be used for applications such as delivery of light from powerful, tuneable Ti:Sapphire lasers. Hence, the fibres may be designed to guide light at wavelengths between 0.78 µm to 0.98 µm. For other systems, e.g. systems employing lasers and amplifiers based on rare-earth doping, the fibres may be designed to guide light at specific wavelengths, corresponding to transitions for particular rare-earths. Important transition lines are located around 1.06 µm and 1.55 µm, and the fibres may be designed to guide light at one of these wavelengths. The fibres according to the present invention, may be used for a number of telecommunication applications—e.g for basic data transmission or for dispersion compensation—where the fibre will be used in the wavelength range from about 1.2 µm to 1.6 µm. Particularly, the fibres may find use in the so-called second and third telecommunication window, i.e. for wavelengths around 1.3 µm and for wavelengths from around 1.5 µm to 1.6 µm. For yet other applications, the fibres may find use at mid-infrared wavelengths, such as around 2.0 µm. The present invention covers preferred embodiments, where the predetermined wavelength is within the above-mentioned wavelength ranges.

In a preferred embodiment, fibres according to the present invention may have single-mode operation. This property is important both for applications at short wavelengths —e.g. for lithographic applications—as well as for longer wavelength applications, such as telecommunication applications around 1.55 µm.

Often, a fibre according to the present invention should also be able guide light for a range of wavelengths below the predetermined wavelength. This is e.g. the case for wavelength multiplexing systems used in telecommunication systems, where the fibre should be single mode at wavelengths in the range from 1.5 µm to 1.6 µm. For other applications, such as fibre amplifiers or fibre laser, the fibres are desired to be single-mode at a pump wavelength that may be significantly below the predetermined wavelength. Therefore, preferred embodiments of the present invention covers fibres with single mode operation for wavelength ranges down to 0.3 µm.

The present invention addresses micro-structured fibres, where the elongated features are substantially periodically distributed. Hence, when we are discussing the spacing of elongated elements, we will mean the centre-to-centre distance between two neighbouring features. This centre-to-centre spacing is e.g. for a close-packed arrangement of the features identical to the pitch of the periodic structure.

In a preferred embodiment, the core itself contains features. This allows to further tune the effective refractive index of the core region according to the desired properties for a given application. Depending on the specific application, it is possible to adjust the cladding feature arrangement, the cladding feature size(s), core feature arrangement and/or core feature size(s). Preferably, the core features have a spacing that is smaller than the predetermined wavelength of light guided through the fibre. In further preferred embodiments, the core feature spacing is smaller than 0.2 times the predetermined wavelength.

In yet another preferred embodiment, the core feature spacing is smaller than the cladding feature spacing. The main advantage of this is the achievement of a higher flexibility when tailoring the mode-shape of light guided through the fibre. By using core features that are smaller than the cladding features, it is possible to increase the number of core features and thereby to provide a better mode shaping. For most applications, it is desired to have a mode-shape that is as close as possible to a gaussian shape, in order to reduce coupling losses at e.g. splicing to standard fibres.

To provide the largest flexibility for mode-shaping, it is preferred that the number of core features is larger than two. To further increase the mode-shaping flexibility, it is preferred that the number of core features is larger than 5, and even further preferable that the number of core features is larger than 17.

The fabrication method involving stacking that is most commonly used for the fabrication of micro-structured fibre, would for the realization of fibres according to the present invention favour the use of specific numbers of core features (when these have a size smaller than the cladding features—preferably a core feature spacing of a third of the cladding feature spacing). Therefore, in a preferred embodiment, the number of core features is equal to 7, or is equal to 13 or is equal to 19.

In yet another preferred embodiment, the core material (the background material of the core region) has a lower refractive index than the cladding material. This allows a further flexibility of tailoring the dispersive properties of fibres guiding. This refractive index difference may be obtained e.g. by using different dopants in the two materials (e.g. silica doped to various degrees), or it may be obtained simply by using different basis materials (e.g. different types of polymers).

In yet another preferred embodiment the refractive index of the core and cladding background materials are identical. This may e.g. be preferred in cases where fibre losses are a critical issue, and the fibre must be fabricated from the purest possible material. In this case it is preferred to use the same (pure) material for the core and cladding material, such as silica. Also with respect to fabrication method, it may be an advantage to use the same core and cladding material (and therefore the same refractive index of the core and cladding material). This is e.g. the case where a difference in thermal expansion coefficient for the core and cladding materials cannot be tolerated. The presently used fabrication methods for micro-structured fibres are generally not in favour of the use of different core and cladding materials. Hence, fibres with the same core and cladding material are preferred.

In order to obtain the strongest possible dispersive properties of the fibres according to the present invention, it is preferred that a high fraction of the cladding features have a cross-sectional dimension that is larger than the predetermined wavelength. Hence, preferred embodiments cover fibres, where more than 20% of the cladding features are larger than the predetermined wavelength, such as more than 40%, more than 60%, or more than 80% of the cladding features are larger.

In a preferred embodiment, the core has a diameter larger than 2 µm. Generally, for telecom applications a core size in the range from about 2 µm to 10 µm is desired. In a further preferred embodiment, the core diameter is in the interval from 2 to 10 µm, such as in the interval from 4 to 6 µm. The advantages for having core diameters within these ranges are to provide fibres for lowering/elimination of non-linear effects, and/or for low coupling losses to standard transmission fibres. For high-power applications, a larger core size is desired such as from about 10 µm to 50 µm.

In order to obtain the strongest possible dispersive effects in fibres according to the present invention, it is preferred to have the cladding feature size as large as possible. Hence, in a further preferred embodiment, the cladding features should have a diameter that is larger than 0.45 times the cladding feature spacing, such as a diameter larger than 0.6 times the cladding feature spacing, such as larger than 0.9 times the cladding feature spacing. Also it is preferred that cladding features occupy at least 25% of the cross-section of the cladding region, such as more than 40%, such as more than 50%, such as more than 60%, such as more than 70%, such as more than 80%.

It is further preferred that in order to guide light in a single mode with strong dispersion, that the core features occupy more than 5% of the cross-section of the core region, such as more than 10%, such as more than 25%, such as more than 50%, such as more than 75%.

In a further preferred embodiment the core features are periodical core features. This allows the simplest manner for fabrication of fibres with a micro-structured core region.

In a further preferred embodiment the spacing of the core features and of the cladding features are in the range of about 0.2 µm to 10 µm.

In a further preferred embodiment, the cladding features may have a spacing in the range of about 0.1 to 10 times the wavelength of any light guided through the fibre, such as in the range of about 0.5 to 1, such as in the range of about 1 to 2, such as in the range of about 2 to 5, or such as in the range of about 5 to 10. The potential of dimensioning the cladding features within the above-described ranges provides a high flexibility when tailoring the dispersion properties for specific applications. It is important that strong dispersion may well be obtained for small cladding features.

In a further preferred embodiment, the core features have a spacing in the range of about 0.1 to 10 times the wavelength of any light guided through the fibre, such as in the range of about 0.5 to 1, such as in the range of about 1 to 2, such as in the range of about 2 to 5, such as in the range of about 5 to 10. As for the above-described preferred embodiment, this embodiment ensures a large flexibility of the present invention with respect to specific applications.

In a further preferred embodiment, the core features have a spacing in the range of about 0.1 µm to 10 µm, such as in the range of about 0.5 µm to 1 µm, such as in the range of about 1 µm to 2 µm, such as in the range of about 2 µm to 5 µm, or such as in the range of about 5 µm to 10 µm. Again this embodiment ensures a large flexibility of the present invention with respect to specific applications.

In a further preferred embodiment, any of the core features and/or the cladding features comprise polymer(s), a material providing an increased third-order non-linearity, a photo-sensitive material, or a rare earth material. This preferred embodiment allows the realization of various applications, such as fibre laser, amplifiers, wavelength converters, optical switches, tuneable fibres and devices, etc. The use of polymer(s) as background material for the fibres allows potentially cheap and very flexible fabrication of the fibres covered by the present invention.

In a further preferred embodiment, the core or the cladding may comprise a dopant (e.g. an active or photosensitive material) or a material showing higher order (non-linear) optical effects. This preferred embodiment also allows the realization of various applications, such as fibre laser, amplifiers, wavelength converters, optical switches, tuneable fibres and devices, tuneable fibres and devices, etc. Higher order (non-linear) effects may be used for e.g., soliton communication or more generally in applications, where non-linear effects are influencing the propagation properties of signals in optical communication systems. This also includes realisation of components for optical signal processing and for switching. Especially for applications for fibre lasers or fibre amplifiers, the dopant in the core or the cladding may be e.g., a rare-earth dopant adapted to receive pump radiation and amplify radiation travelling in the core region. The dopant may also be a light sensitive dopant, such as Germanium. In that situation, the dopant may be use for e.g. optically writing a grating in the fibre or core region. Of particular interest is the use of photosensitive materials to allow writing of 1 D gratings in the longitudinal direction of the fibres. Fibres with such gratings, combined with the large mode area, are attractive for high power fibre lasers.

For a range of applications, such as e.g. dispersion compensation in D-WDM systems, it is preferred that the fibres according to the present invention are guiding light in a single mode at several predetermined wavelengths.

The present invention also covers embodiments wherein the fibre is dimensioned to guide light of the predetermined or operating wavelength in two substantially, non-degenerate polarization states.

It is also within embodiments of fibres of the present-invention that the cladding features in the cross-section have a non-circular shape, such as an elliptical shape or a rectangular shape.

It is also within embodiments of fibres of the present invention that the shape of the core region deviates substantially from a circular shape in the fibre cross-section. Thus, the shape of the core region may be substantially rectangular in the fibre cross-section. Preferably, the core region and/or cladding region may have a substantially 180 degree rotational symmetry in the fibre cross-section.

The present invention also covers embodiments wherein the fibre is dimensioned to guide light with a large anomalous dispersion of more than 100 ps/nm/km at a wavelength in the range from 1.4 µm to 1.7 µm, where the core region has a relatively large size of more than 4 µm in diameter, such as a core diameter of around 5 µm.

It is also within embodiments of fibres of the present invention that the fibre is dimensioned to guide light with a large anomalous dispersion of more than 200 ps/nm/km at a wavelength in the range from 1.3 µm to 1.7 µm, where the core region has a diameter of more than 2 µm, such as a core diameter of around 4 µm.

The present invention also covers use of the fibres in fibre optical communication system of part thereof, such as for dispersion control, including dispersion compensation, or as transmission fibre at wavelength(s) in the range from 1.2 µm to 1.7 µm, where the fibre is dimensioned to exhibit anomalous dispersion over a wavelength range from at least 1.2 µm to 1.7 µm.

Fibres according to the present invention will often have a solid overcladding surrounding the micro-structured cladding and core regions. Typically, this overcladding will consist of silica having a higher refractive index than the effective refractive index of the micro-structured cladding region in order to strip off cladding modes.

BRIEF DESCRIPTION OF THE DRAWINGS

FIGS. 3a and 3b show two scanning electron micrographs of real, PBG fibres as shown schematically in FIGS. 1a and 2a.

The core has a predetermined refractive index profile.

Figure 12:
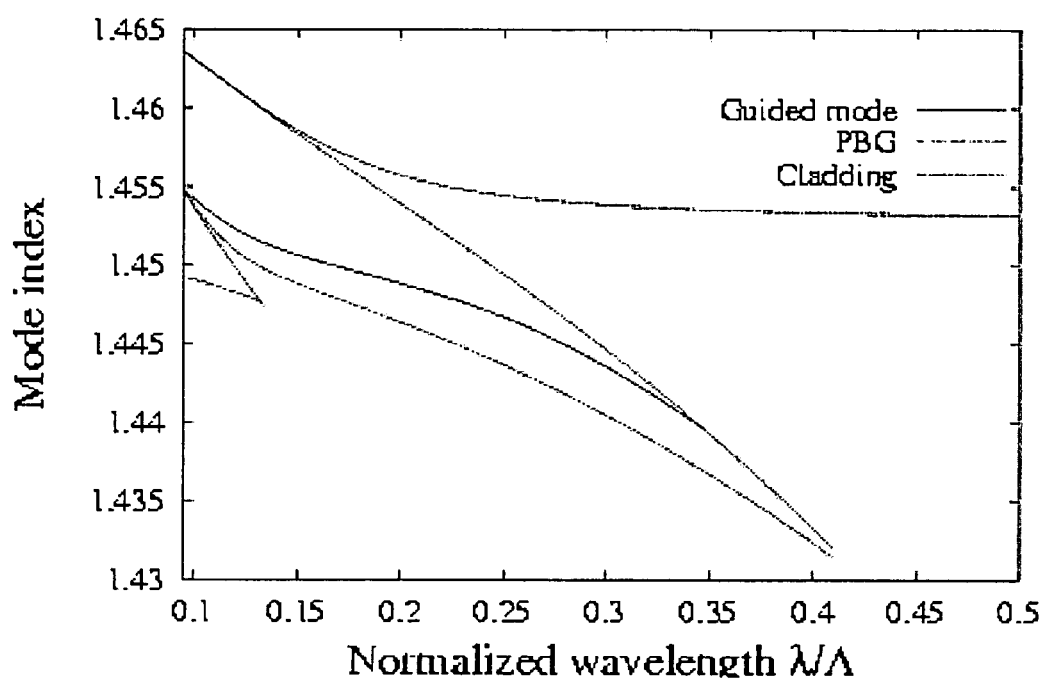
FIG. 12 illustrates the operation of another PBG fibre according to the present invention.
Figure 13A:
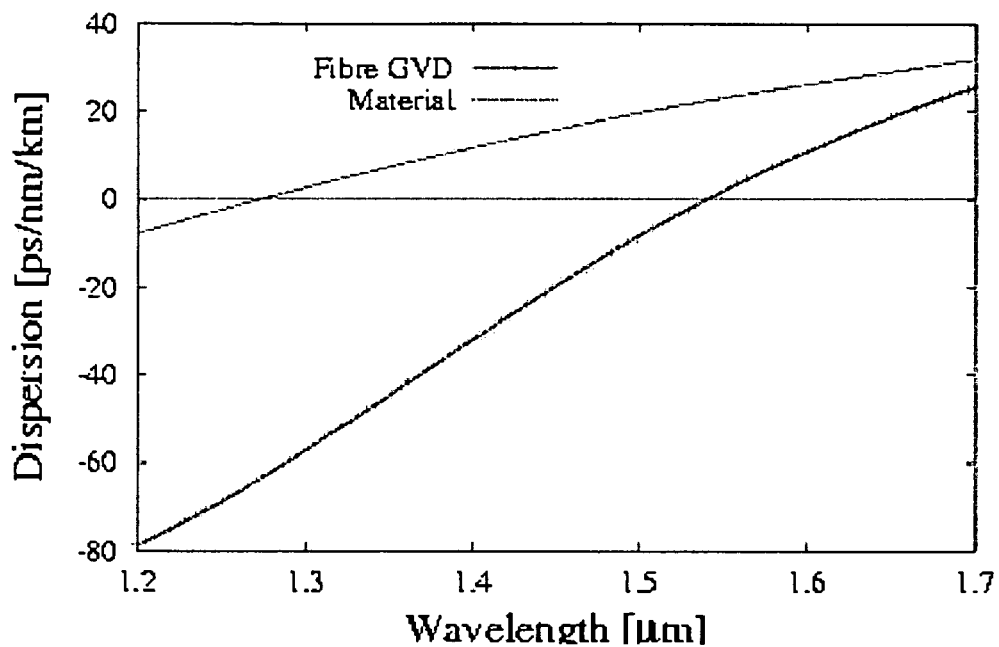
Figure 13B:
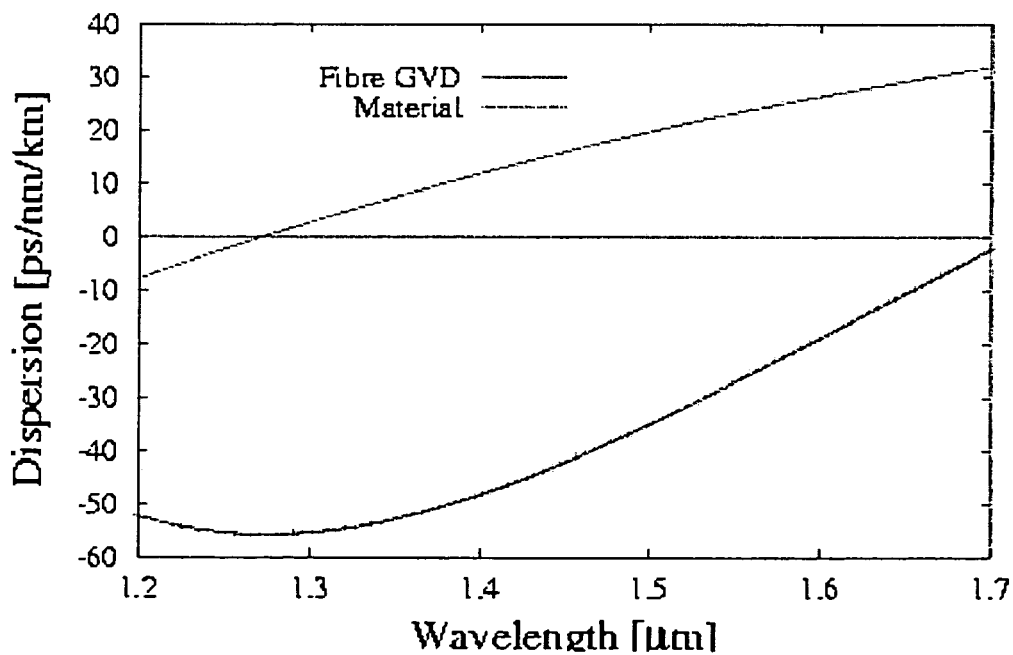

FIG. 13a schematically shows the dispersion properties at visible to near-infrared wavelengths of the PBG fibre in FIG. 12. FIG. 13b shows schematically the dispersion of another PBG fibre according to the present invention.

Figure 14A:
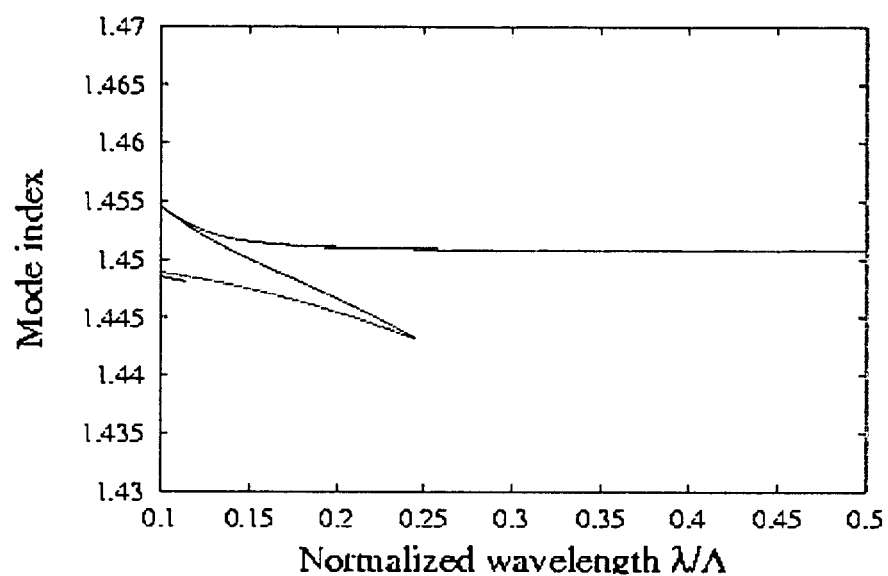
Figure 14B:
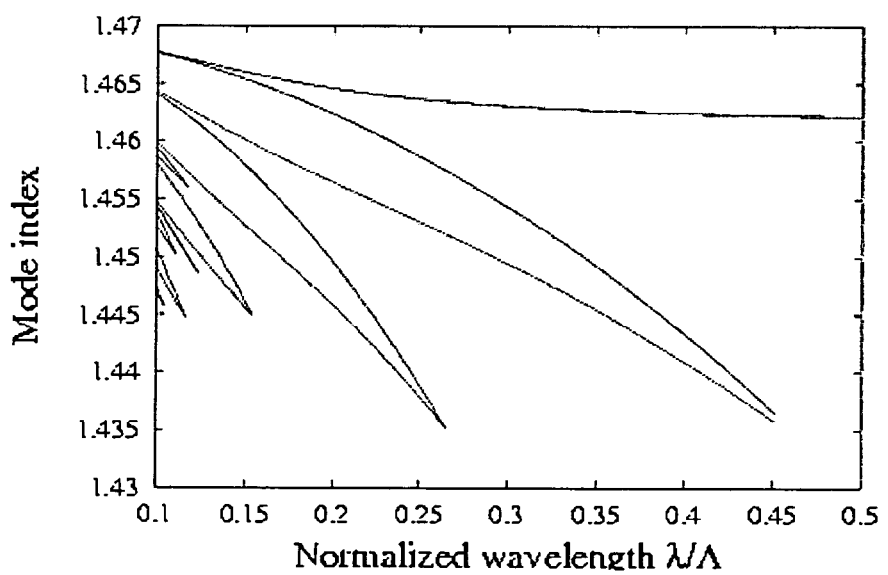

FIG. 14a shows the photonic bandgaps that are exhibited by another cladding structure according to the present invention. FIG. 14b shows the photonic bandgaps that are exhibited by yet another cladding structure according to the present invention.

Figure 15:
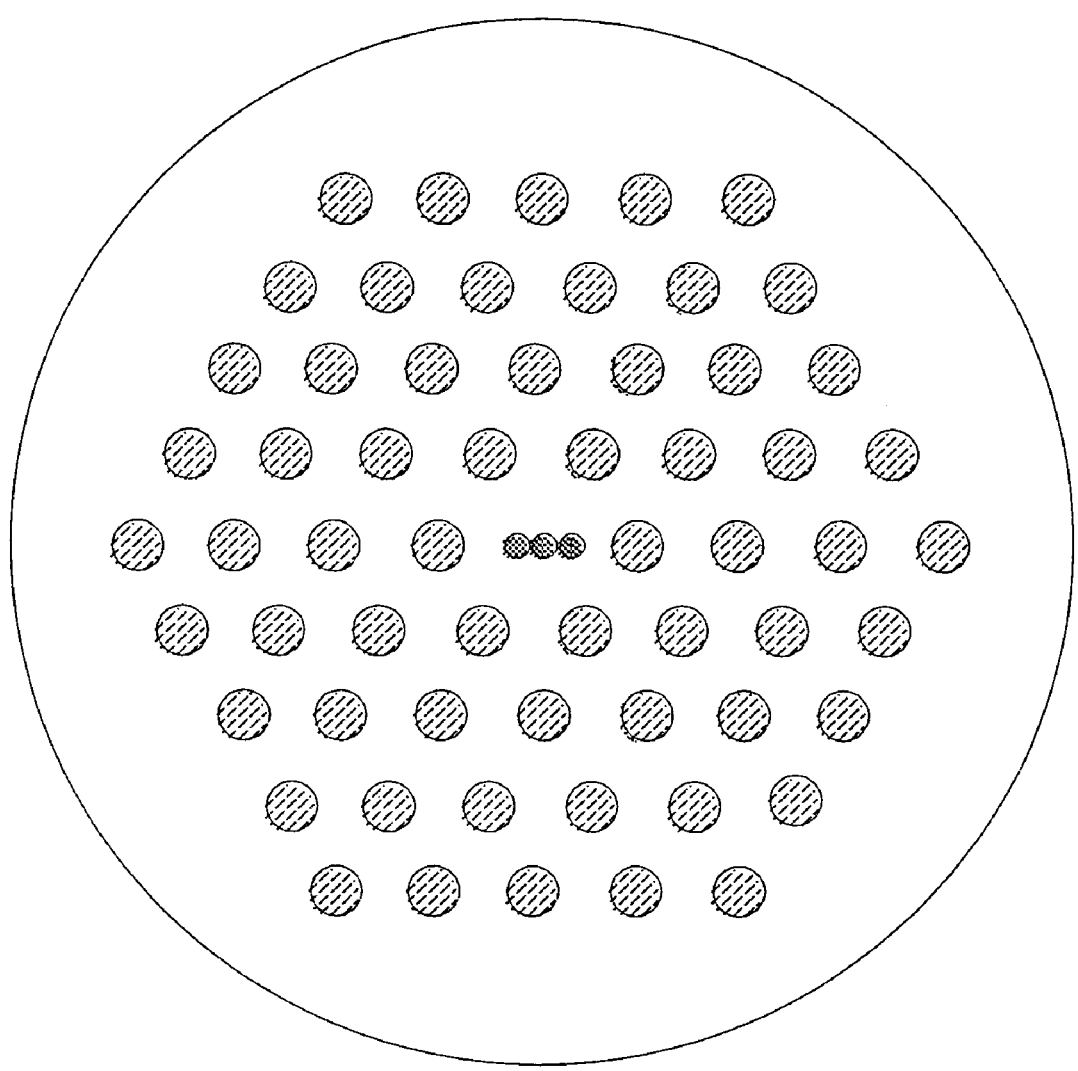

FIG. 15 shows schematically another example of PBG fibres according to the present invention. These designs provide special polarization properties, and the fibre may comprise a number of core features.

Figure 16:
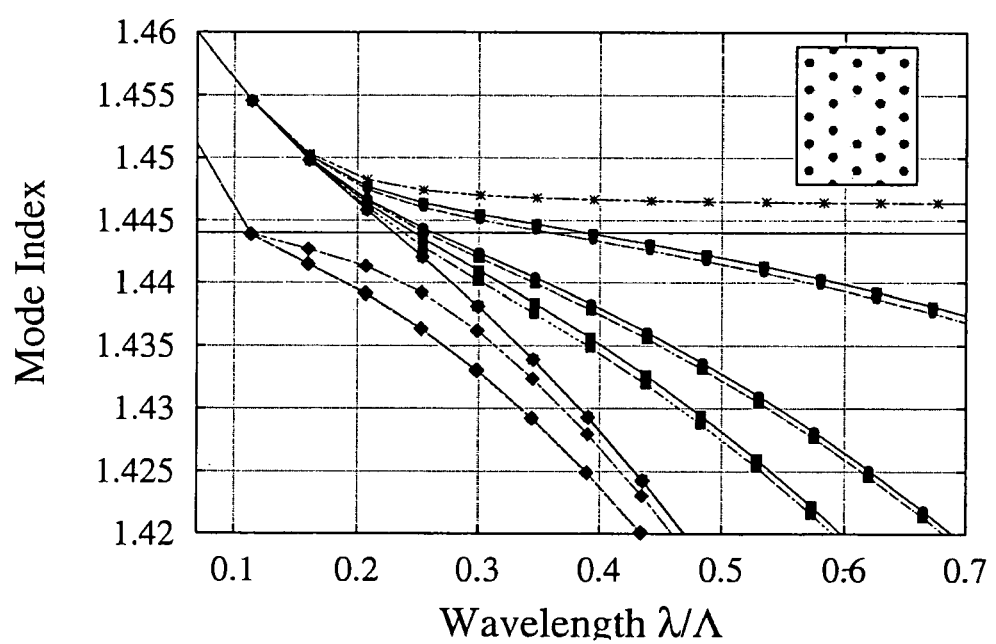

FIG. 16 illustrates the operation of another PBG fibre according to the present invention.

Figure 17:
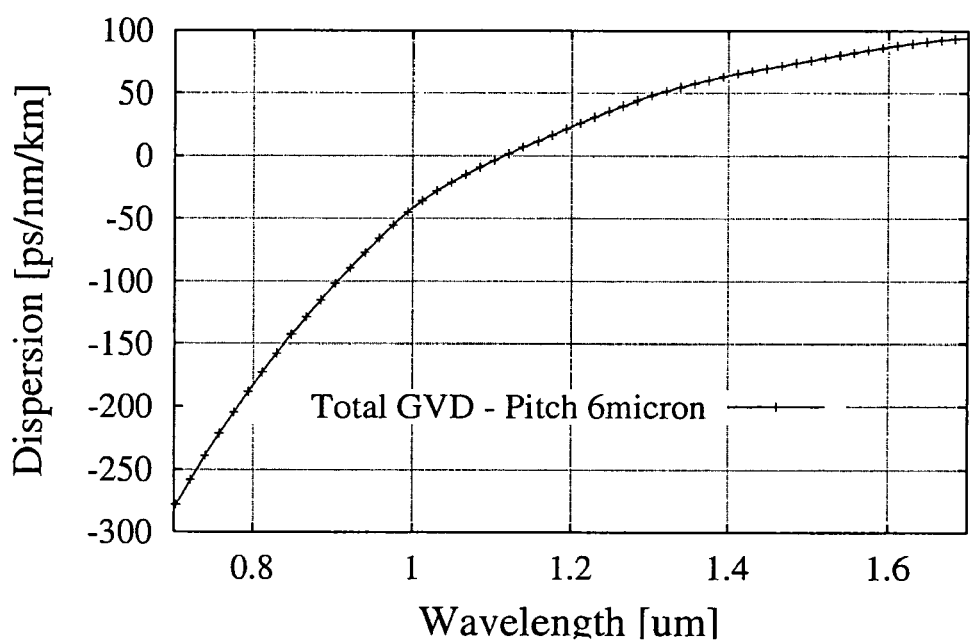

FIG. 17 shows the dispersion properties at visible to near-infrared wavelengths of the PBG fibre in FIG. 16.

Figure 18A:
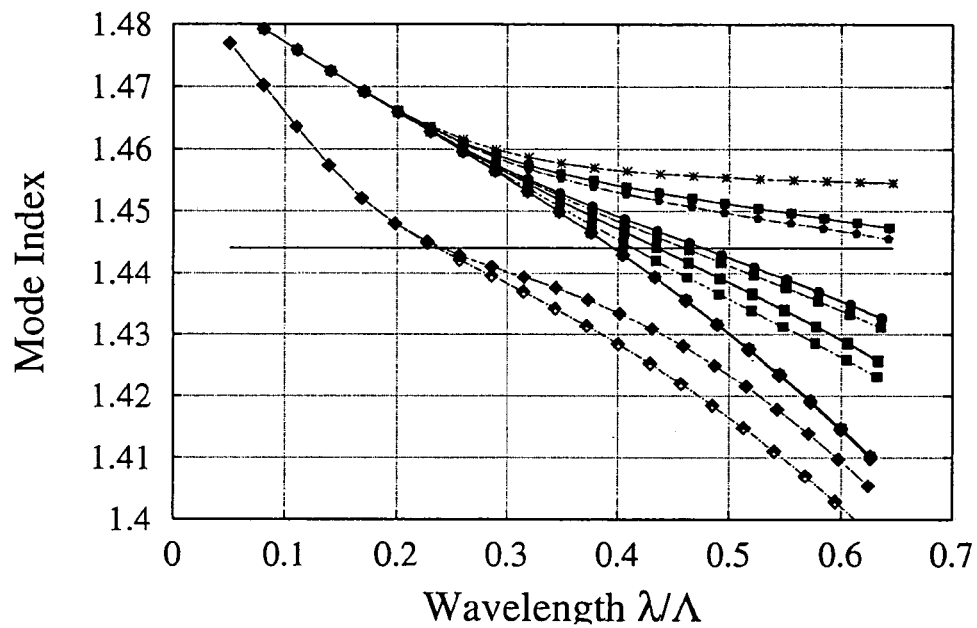
Figure 18B:
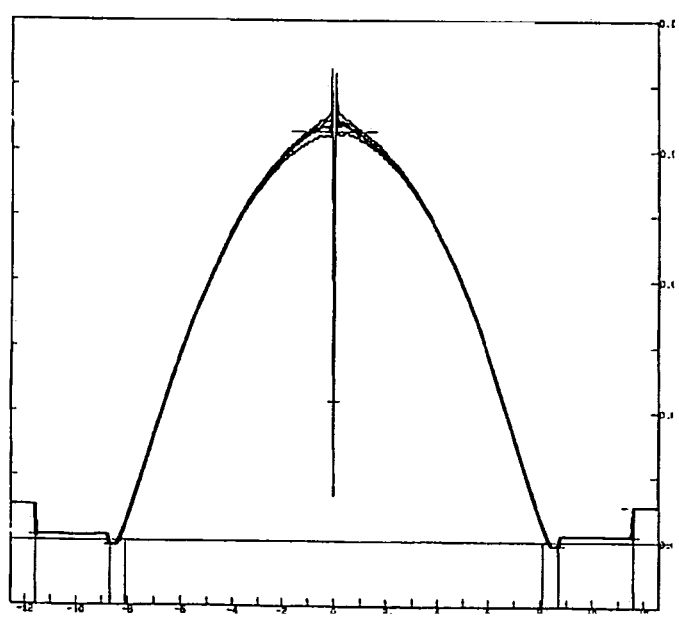

FIG. 18 illustrates the operation of another PBG fibre according to the present invention (FIG. 18a), and the refractive index profile of the high-index cladding features (FIG. 18b).

Figure 19A:
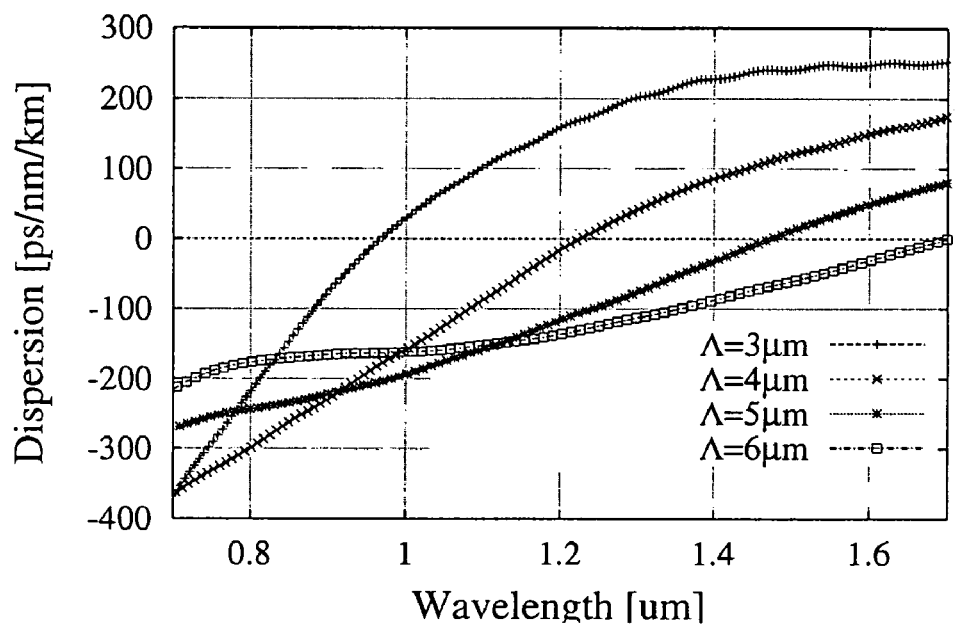
Figure 19B:
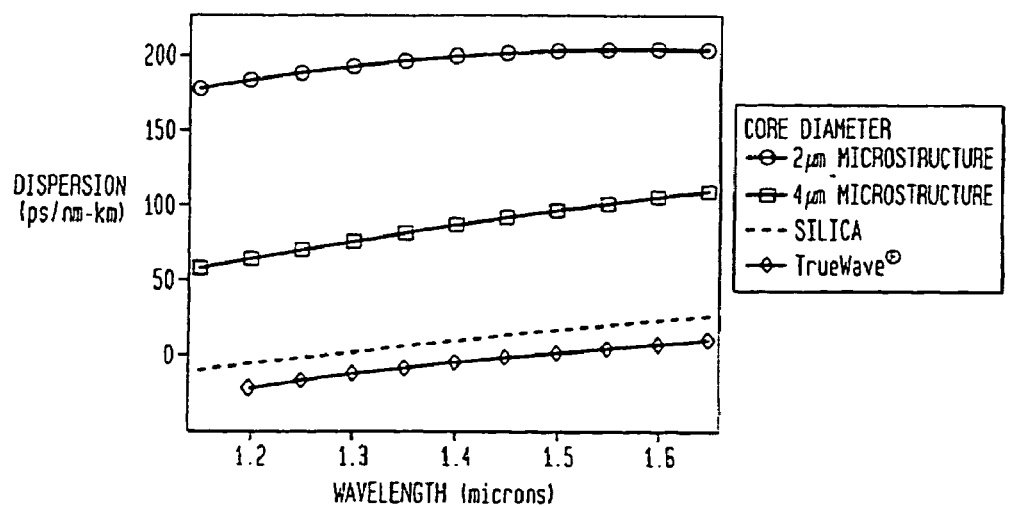

FIG. 19 schematically shows the dispersion properties at visible to near-infrared wavelengths of the PBG fibre in FIG. 18 (FIG. 19a). FIG. 19 shows further the dispersion of a prior art fibre for dispersion control (FIG. 19b).

Figure 20A:
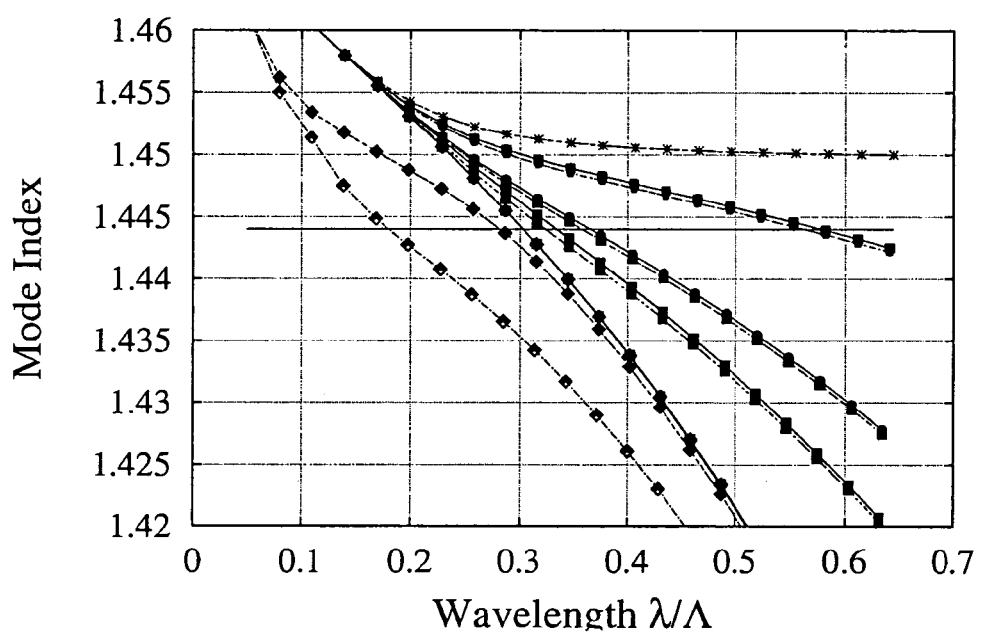
Figure 20B:
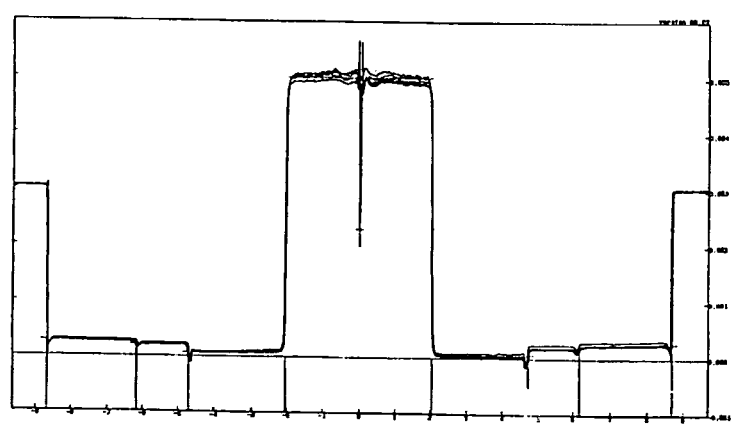

FIG. 20 illustrates the operation of another PBG fibre according to the present invention (FIG. 20a), and the refractive index profile of (parts on the core (FIG. 20b).

Figure 21:
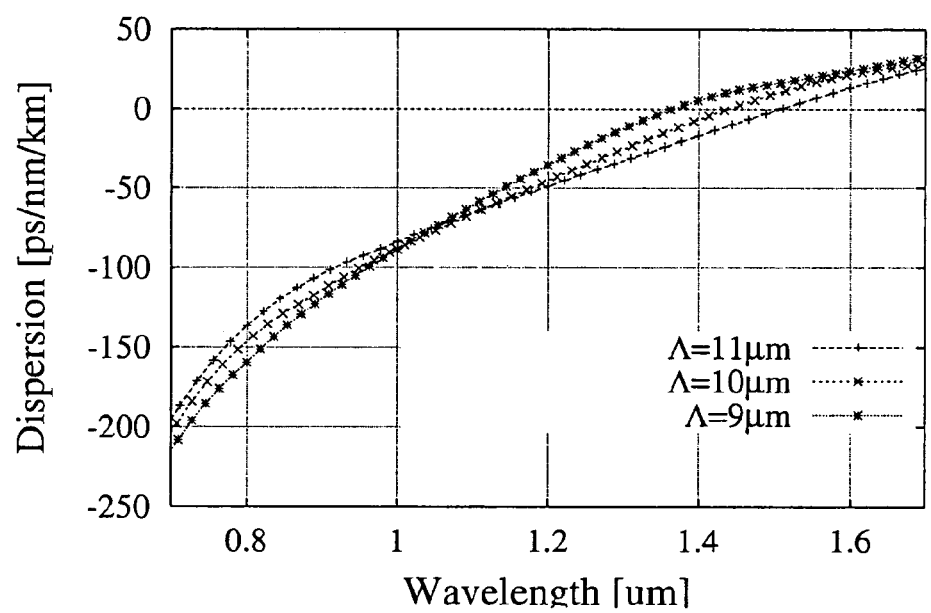

FIG. 21 schematically shows the dispersion properties at visible to near-infrared wavelengths of the PBG fibre in FIG. 20

Figure 22:
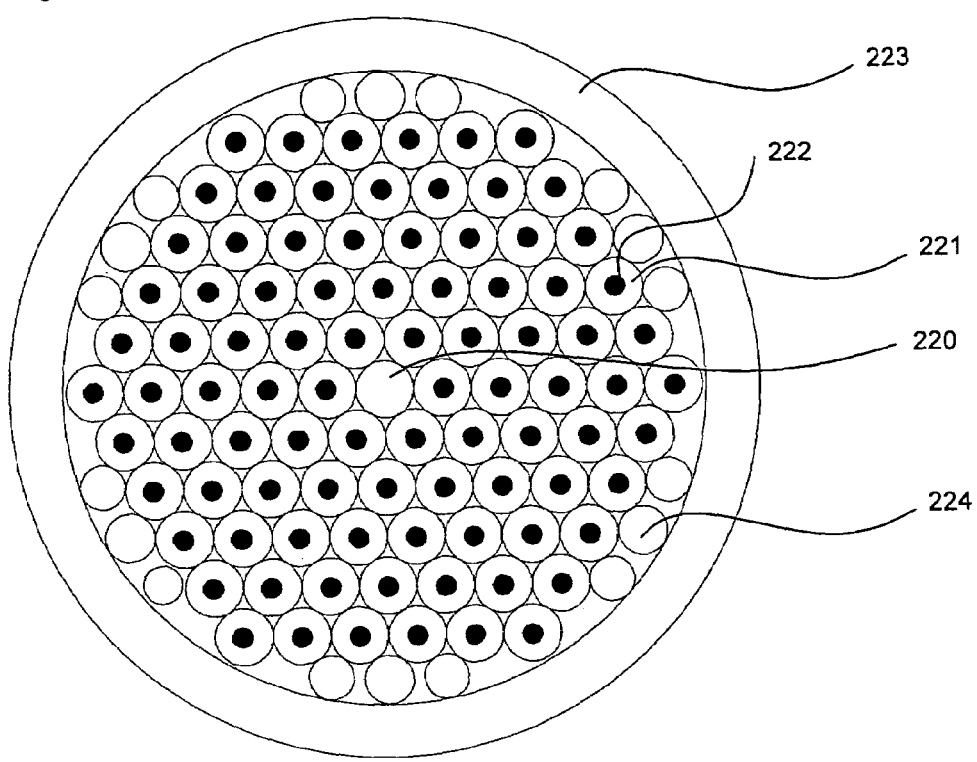

FIG. 22 shows schematically an example of a preform for fabrication of a fibre according to the present invention.

GLOSSARY AND DEFINITIONS

In this application we distinguish between "refractive index" and "effective refractive index". The refractive index is the conventional refractive index of a homogeneous material. In this application we consider mainly optical wavelengths in the visible to near-infrared regime (wavelengths from approximately 400 nm to 2 µm). In this wavelength range most relevant materials for fibre production (e.g. silica) may be considered mainly wavelength independent, or at least not strongly wavelength dependent. However, for non-homogeneous materials, such as micro-structures, the effective refractive index is very dependent on the morphology of the material. Furthermore the effective refractive index of a micro-structure is strongly wavelength dependent—much stronger than the refractive index of any of the materials composing the micro-structure. The procedure of determining the effective refractive index of a given micro-structure at a given wavelength is well-known to those skilled in the art (see e.g. Jouannopoulos et al, "Photonic Crystals", Princeton University Press, 1995 or Broeng et al, Optical Fiber Technology, Vol. 5, pp.305-330, 1999).

Usually a numerical method capable of solving Maxwell's equation on full vectorial form is required for accurate determination of the effective refractive indices of micro-structures.

The present invention makes use of such a method that has been well-documented in the literature (see previous Joannopoulos-reference). In the long-wavelength regime, the effective refractive index is roughly identical to the weighted average of the refractive indices of the constituents of the material. For micro-structures, a directly measurable quantity is the so-called filling fraction that is the volume of disposed features in a micro-structure relative to the total volume of a micro-structure. Of course, for fibres that are invariant in the axial fibre direction, the filling fraction may be determined from direct inspection of the fibre cross-section. When discussing an operational or predetermined wavelength and an effective refractive index in the present invention, the effective refractive index should generally be determined at the operational or predetermined wavelength.

DETAILED DESCRIPTION OF THE INVENTION AND SOME PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1A:
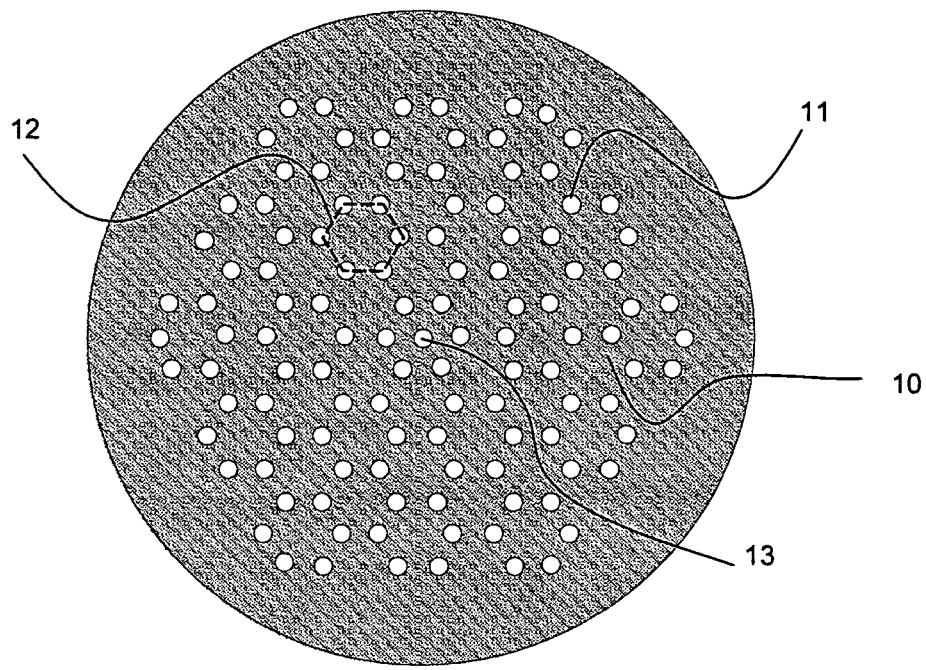
FIG. 1a illustrates schematically the design of a prior art micro-structured fibre operating by PBG effects. The cladding features are voids arranged in a so-called honeycomb structure.

A typical air-silica PBG fibre known from the prior art is illustrated schematically in FIG. 1a. The figure shows a cross-section of the fibre. The fibre consists of a background material 10 and it is invariant in the longitudinal direction (the direction perpendicular to the illustrated cross-section). The fibre has a cladding region characterized by an array of low-index features 11 that run along the fibre axis. In the prior art, the most commonly used background material is silica and the features are most commonly air holes. The holes are arranged periodically—in this case in a so-called honeycomb arrangement—characterized by a unit cell 12. The periodic arrangement of the air holes allows the cladding to exhibit a so-called out-of-plane, two-dimensional PBG (see previously mentioned Broeng et al. and Birks et al. references). We will refer to this mechanism shortly using the term PBG. Using the PBG effect, the periodic cladding structure is able to reflect light for certain ranges of free-space wavelengths, $\lambda$, and propagation constants, $\beta$. This allows to confine light in a core region having a lower effective refractive index than the effective refractive index of the cladding. A low-index core region have for example in the prior art be realised using an extra air hole 13—see e.g. Broeng et al. Optical Fiber Technology, Vol. 5, pp. 305-330, 1999.

Figure 1B:
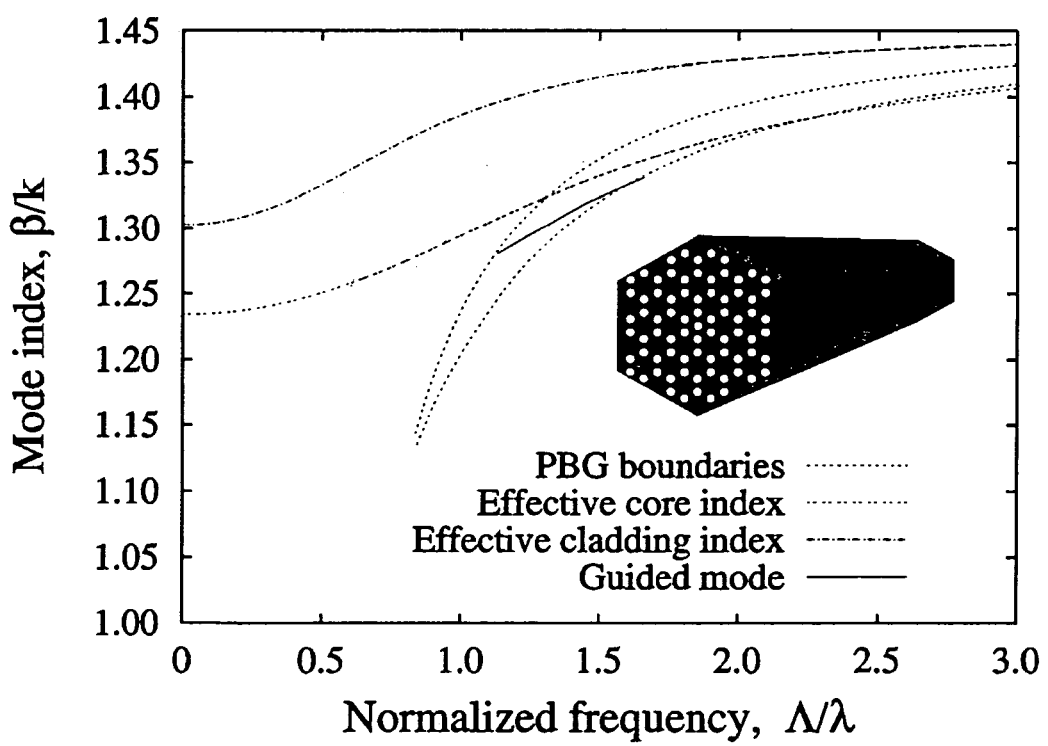
FIG. 1b illustrates the operation of the fibre.

To illustrate more quantitatively the operation of the air-silica PBG fibre in FIG. 1a, FIG. 1b shows the PBGs exhibited by the cladding structure as well as the effective refractive indices of the cladding and core regions. The present inventors use here a type of illustration where the effective indices are shown as a function of a normalized frequency that is defined as $\Lambda/\lambda$, where $\Lambda$ is the centre-to-centre spacing between two cladding features. This type of illustration is known from the literature and is often chosen in order to show that the PBG fibre properties may be scaled to a given wavelength by scaling $\Lambda$. The figure shows further the mode index of a guided mode of the fibres. This mode is only guided over a limited spectral range (from around $\Lambda/\lambda=1.2$ to $\Lambda/\lambda=1.7$ in this specific case)—a property that is in not found for index-guiding micro-structured fibre. For a number of applications, is it naturally important to have the bandwidth as wide as possible.

As another important property, it is seen from FIG. 1b that the guided mode has an effective index that is significantly below that of silica (being 1.45), namely in the range of around 1.27 to 1.32. This property is unique to microstructured fibres compared to index-guiding standard fibres. The ability to provide guided light with mode indices below that of silica has been further explored in order to realize PBG fibres with mode indices around 1.0. Such PBG fibres are capable of guiding light in a completely hollow core.

Figure 2A:
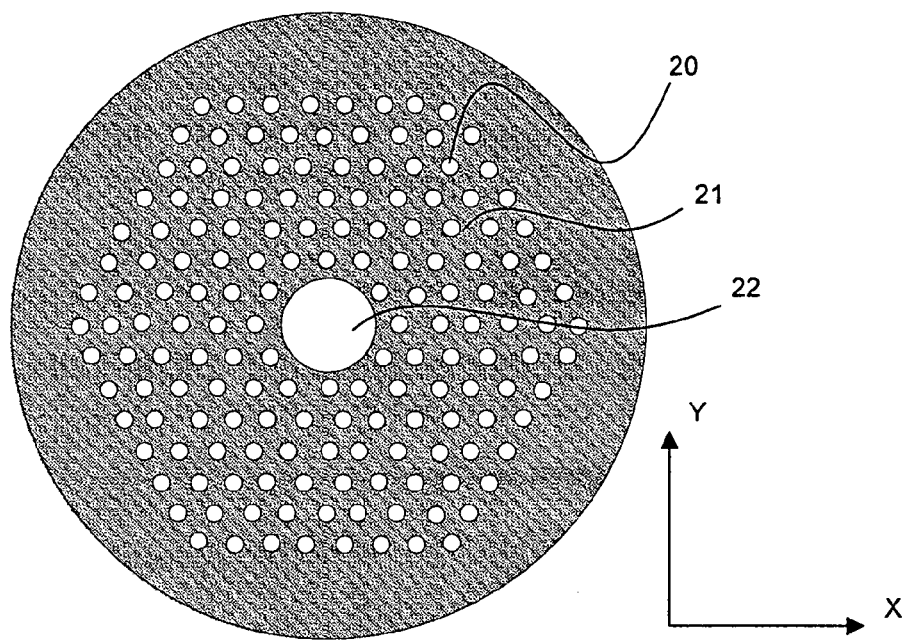
FIG. 2a illustrates schematically the design of another prior art micro-structured fibre operating by PBG effects. The cladding features are voids arranged in a close-packed manner, also known as a triangular structure. This design has been used to realise PBG fibres that guide light in a hollow core (the core is one large void). The operation of the fibre is illustrated in FIG. 2b.
Figure 2B:
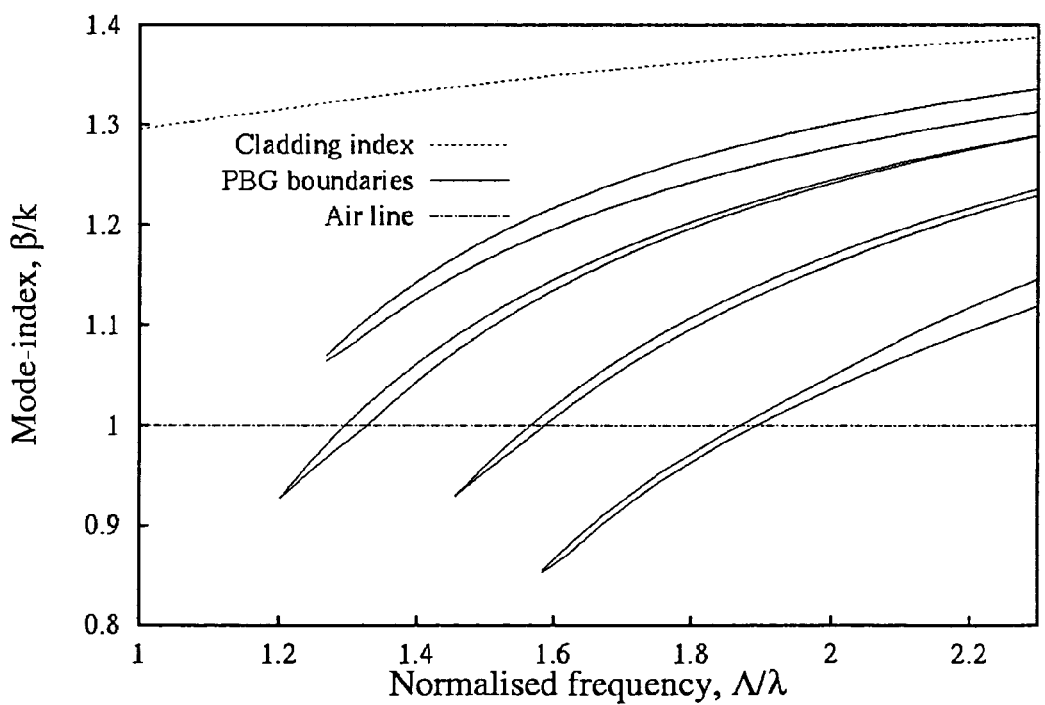

A PBG fibre that has cladding structures exhibiting PBG effects capable of confining light in a hollow core is illustrated in FIG. 2a. The fibre has low-index periodic cladding features 20 arranged in a close-packed manner, also known as a triangular structure, in a high-index background material 21. The core of the fibre is a single large air hole 22. The operation of this PBG fibre may be understood from FIG. 2b that illustrates the effective refractive index of the cladding, the PBGs of the fibre and the core refractive index (equal to 1.0). As seen from the figure, the fibre is capable of guiding light in the air core in narrow spectral ranges (for example in a narrow range around $\Lambda/\lambda=1.30$)

Figure 3A:
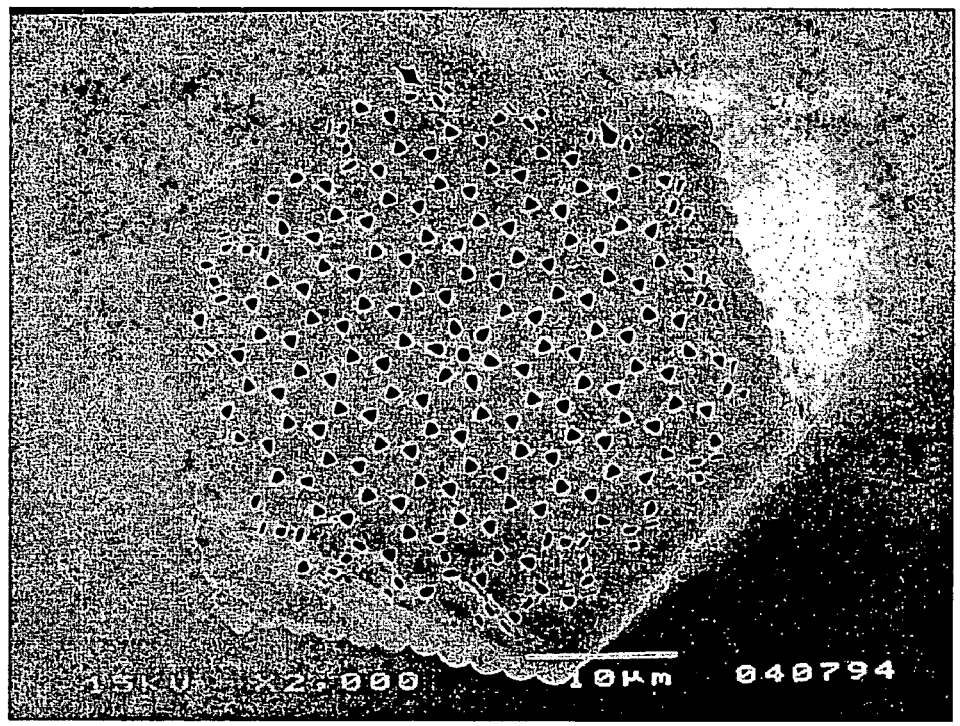
Figure 3B:
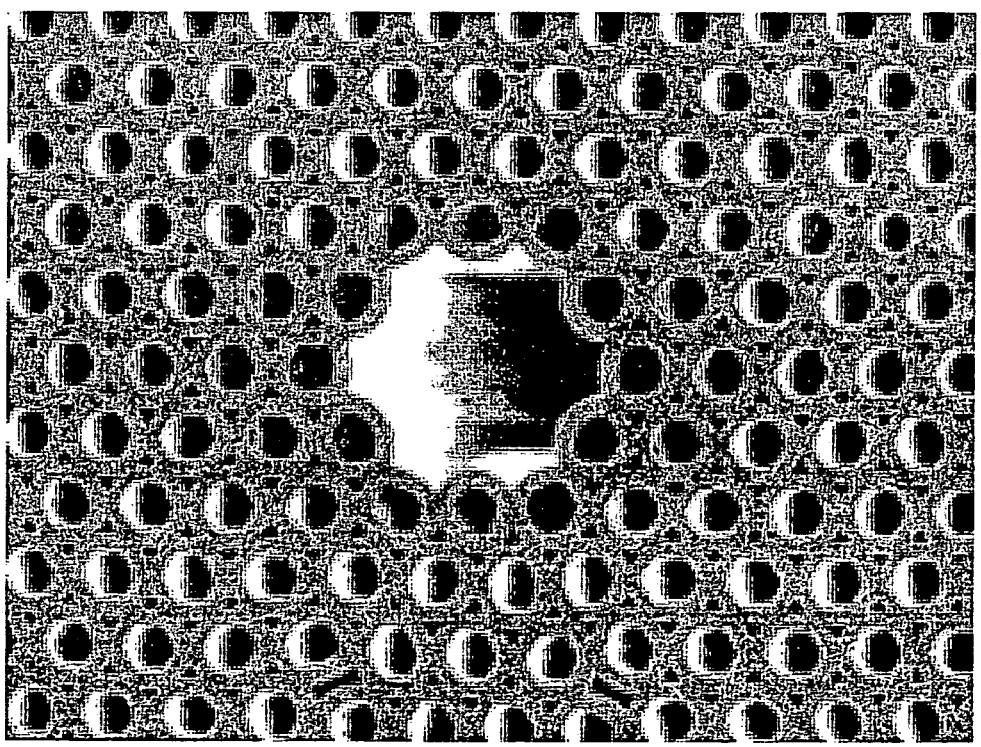

The two PBG fibre designs shown schematically in FIG. 1a and FIG. 2a represent the first two types of PBG fibre that have been fabricated and for which experimental results have been presented in the literature. FIG. 3a and FIG. 3b show scanning electron micrographs of the cross-sections of real, fabricated PBG fibres having these designs (pictures taken from Knight et al., Science, Vol.282 (5393), p. 1476, Nov. 1998 and Cregan et al. Science 285: (5433) pp. 1537-1539, 1999). The PBG fibres in FIG. 3a and FIG. 3b have been fabricated using a relatively simple procedure that is also widely employed for index guiding microstructured fibres, where an array of silica rods and tubes are stacked by hand to form a perform. This preform may be drawn into fibre using a conventional tower setup—for example as described in WO0060388.

Figure 4A:
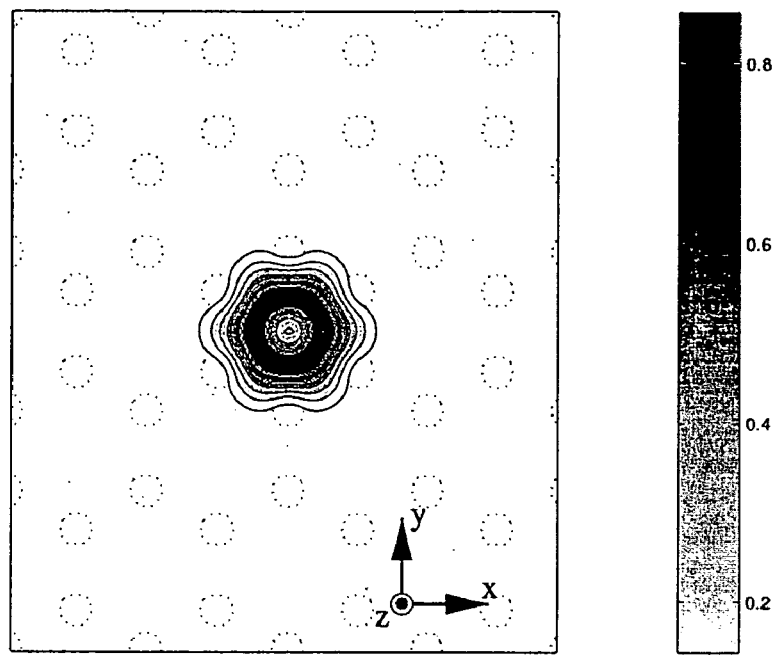
FIGS. 4a and 4b show mode field distribution of the fundamental modes for the two fibres in FIGS. 1 and 2.
Figure 4B:
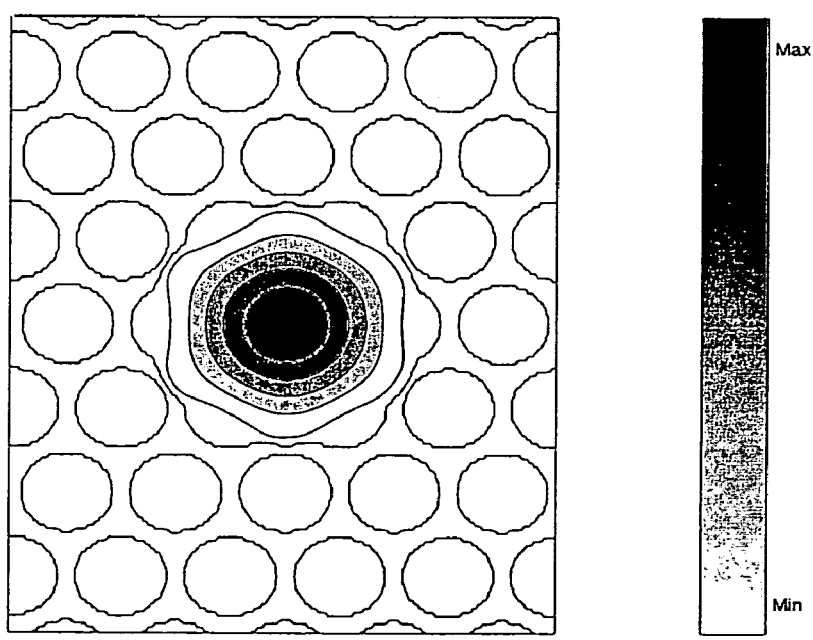

Examples of guided modes in the two fibre designs are illustrated in FIG. 4a and FIG. 4b (similar pictures may be found in Broeng et al. Pure and Applied Optics, pp.477-482, 1999 and Broeng et al. Optics Letters 25: (2), pp.96-98, 2000).

Figure 5A:
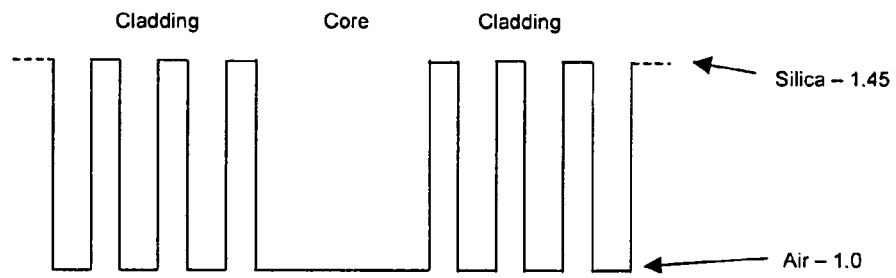
FIG. 5a shows schematically the refractive index profile along one cross-sectional direction of a prior art PBG fibre.

To illustrate the findings of the present inventors, the FIG. 5a illustrates the index profile along the x-direction in the air-silica PBG fibre in FIG. 2a. As seen from this figure, the holes have a lower refractive index than the background material. This relation has in the prior art been taught to be the only feasible manner of realising microstructured fibres that operate using 2D PBG effects. The present inventors have, however, realized that it is possible to turn-upside-down the prior art design rules and fabricate microstructured fibre that operate by 2D PBG effects also if the "holes" have a higher refractive index than the background material and the refractive index contrast between these high-index features and the background material is significantly lower than that of air to silica. In fact, the present inventors have realized that PBG fibre designs using high-index features may be realised using materials with index contrasts that are feasible using well-known silica doping techniques.

In order to present the invention, the proceeding description shall be based on examples. It is to be understood that the examples are merely illustrative of the many possible specific embodiments which can be devised from the present invention as well as there exists many possible applications that may be devised from the principles of the invention. The presented examples are not intended to limit the scope of the invention.

Figure 5B:
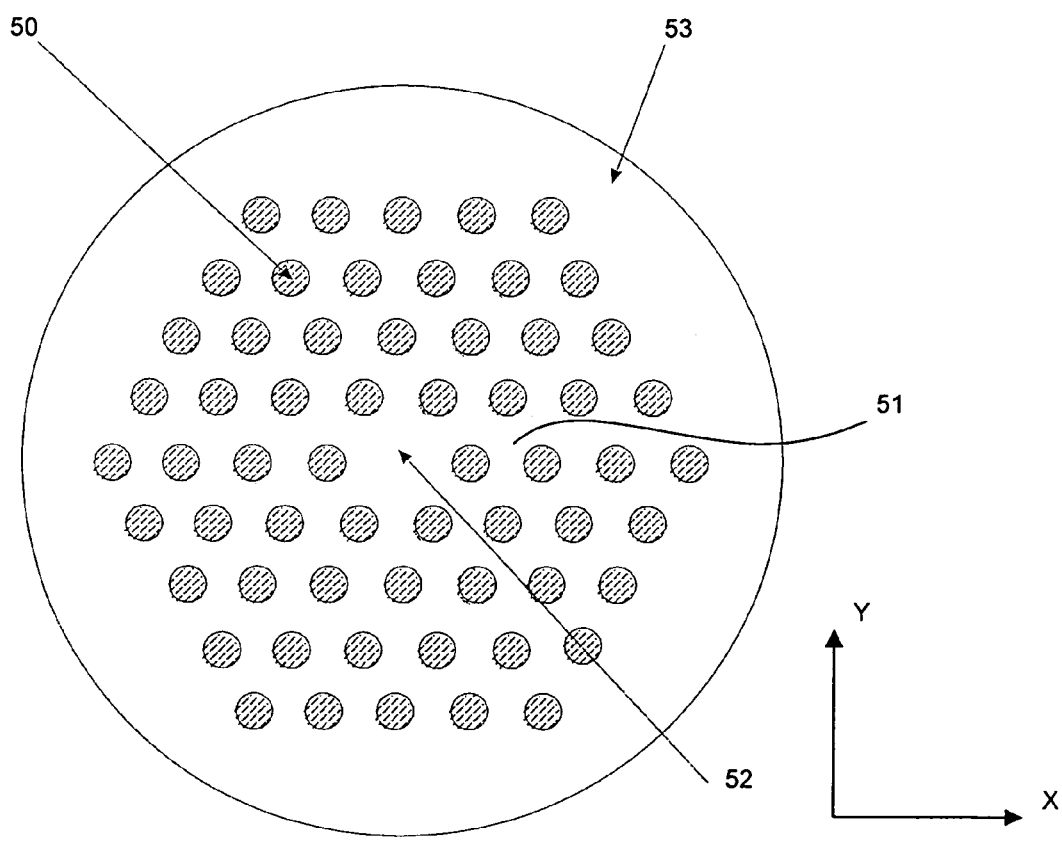
FIG. 5b shows schematically the design of a PBG fibre according to the present invention.
Figure 5C:
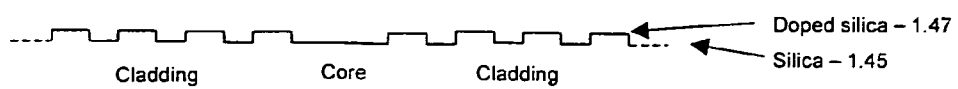
FIG. 5c shows schematically the refractive index profile along one cross-sectional direction of the PBG fibre of FIG. 5b.
Figure 6:
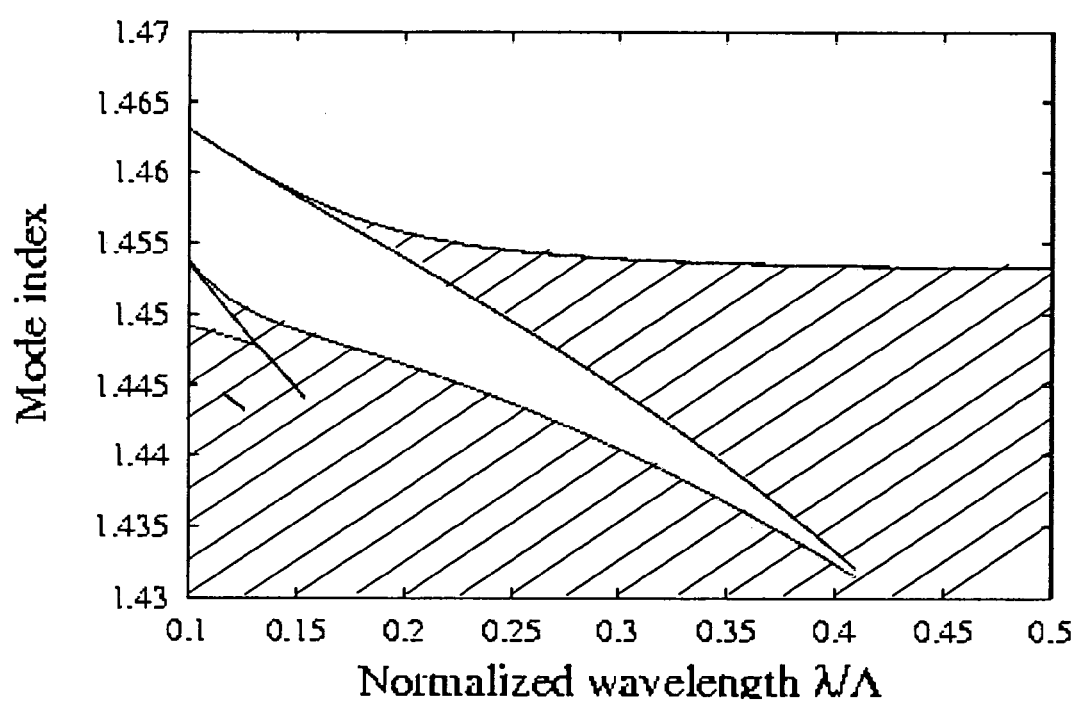
FIG. 6 shows the photonic bandgaps that are exhibited by a cladding structure according to the present invention.

As an example of a PBG fibre according to the present invention, FIG. 5b shows schematically the cross-section of such a fibre, and FIG. 5c shows schematically the refractive index profile along the x-direction of the fibre. Compared to the profile in FIG. 5a, it is important to notice the reversed relation between refractive indices of the cladding feature material and the cladding background material—as well as the very limited refractive index contrast between these materials. In the cladding, the new PBG fibre has a 2D periodic arrangement of high-index features 50 that are placed in a low-index background material 51, and as a core 52, the fibre has a solid material identical to the cladding background material. Due to the high-index features in the cladding, the fibre will not be able to guide light in the core using index guidance effects at all. However, as illustrated in FIG. 6, the cladding structure is, in fact, despite a very limited index contrast between the high-index features and the background material of the cladding capable of exhibiting PBG effects. The specific structure analysed in FIG. 6 consists of high-index features with a refractive index of 1.47 disposed periodically in a close-packed manner in a background material of refractive index 1.45. The features are circular (although this is not a requirement) and they have a diameter, d, of 0.4 times $\Lambda$. The figure illustrates allowed modes of the 2D periodic structure in the shaded region, and, therefore, reveals that forbidden regions (i.e. regions where no modes are allowed) occur even for mode indices of less than that of the background material, namely 1.45. It is important to notice that such forbidden regions do not exist neither for bulk background material nor for bulk feature material—but only takes place as a result of the periodic arrangement of the high-index cladding features. As realised by the present inventors, this is another manifestation of out-of-plane 2D PBG effect with a number of potentially fruitful implications, including the realization of PBG fibres with new properties as well as a significant simplification of the fabrication of PBG fibres.

Figure 7:
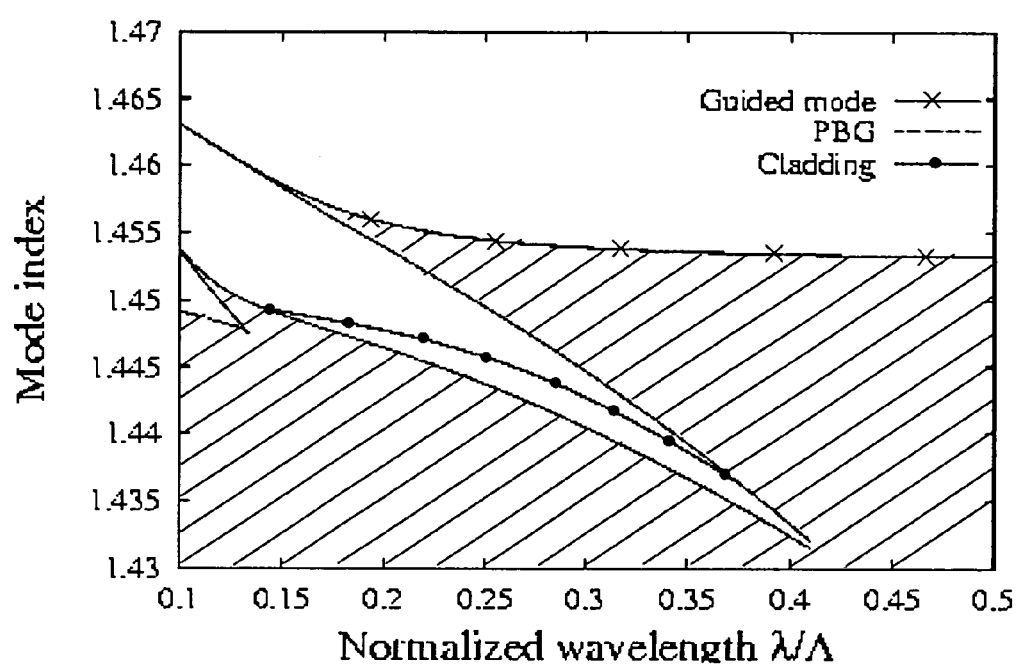
FIG. 7 illustrates the operation of a PBG fibre according to the present invention. The core comprises no isolated features and is made from pure silica.
Figure 8:
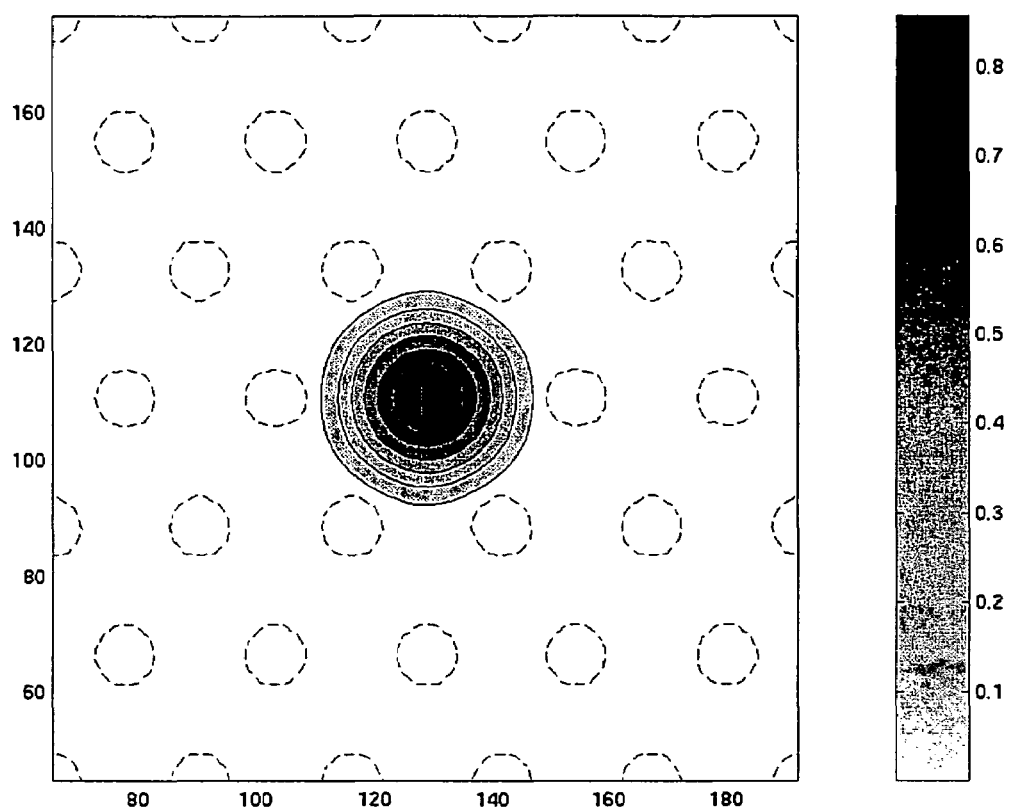
FIG. 8 shows the mode field distribution of the PBG guided mode of the fibre in FIG. 7.

In order to demonstrate not only that claddings realized using low index contrast structures may exhibit PBG effects, but that these may also be utilized to realize new types of PBG fibres, the fibre design of FIG. 5b is analysed. The result of such an analysis is illustrated in FIG. 7. The fibre that is analysed has the same cladding structure as discussed for FIG. 6, and the core is formed by the omission of a single high-index feature. As seen from FIG. 7, the modes supported by the cladding structure are identical to those of the full periodic structure in FIG. 6 (as expected). The fibre, however, supports a single guided mode that is only guided over a limited spectral range from around $\lambda/\Lambda=0.14$ to $\lambda/\Lambda=0.38$. This guided mode is confined due to the PBG effect of the cladding structure (as the mode is positioned inside a forbidden region of the periodic cladding structure) and is confined to the core. FIG. 8 illustrates the mode field distribution of the guided mode at $\lambda/\Lambda=0.2$ (that for $\lambda=1.55$ µm corresponds to $\Lambda=7.8$ µm and a core diameter of around 12.5 µm, with the core diameter defined as $2\Lambda-d$ for this fibre geometry). As seen from FIG. 7, the guided mode has an index close to that of the core (and to that of the background material since the core is made from the same material as the background material)—but at no wavelengths does the guided mode have a higher refractive index than 1.45. Using a well-established terminology from the field of PBG studies, this indicates that the guided mode is introduced as defect mode confined to the low-index region of the core. The core region may be seen as a low-index defect in the otherwise periodic arrangement of high-index features and this low-index defect may support a distinguishable mode. To further underline the special operation of this PBG fibre, it must be noticed that the core has a lower refractive index than the refractive index of the cladding—and furthermore that the core does not contain any circumscribing refractive index boundary towards the cladding—thereby eliminating all possibilities of light guidance using (modified) TIR in the core.

Figure 9A:
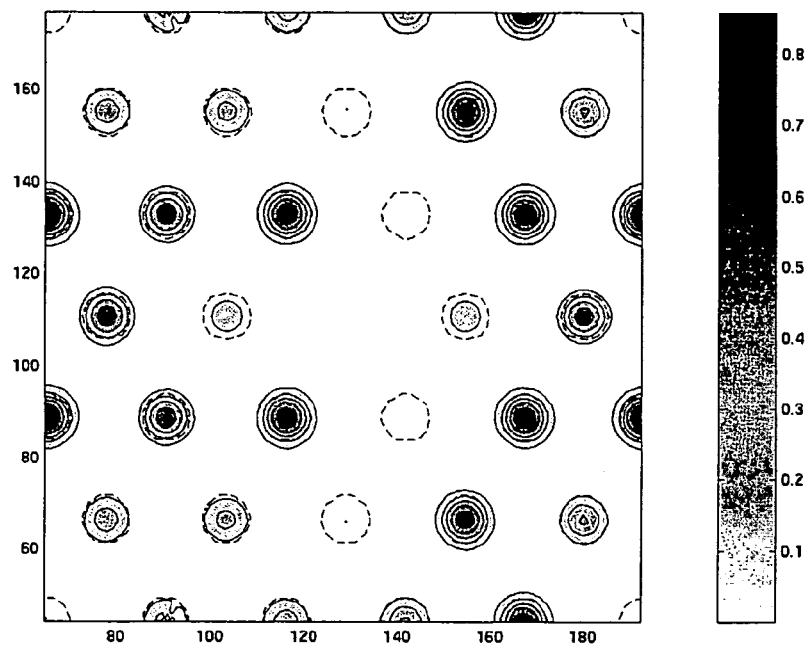
FIG. 9a shows the mode field distribution of a cladding mode positioned above the PBG.
Figure 9B:
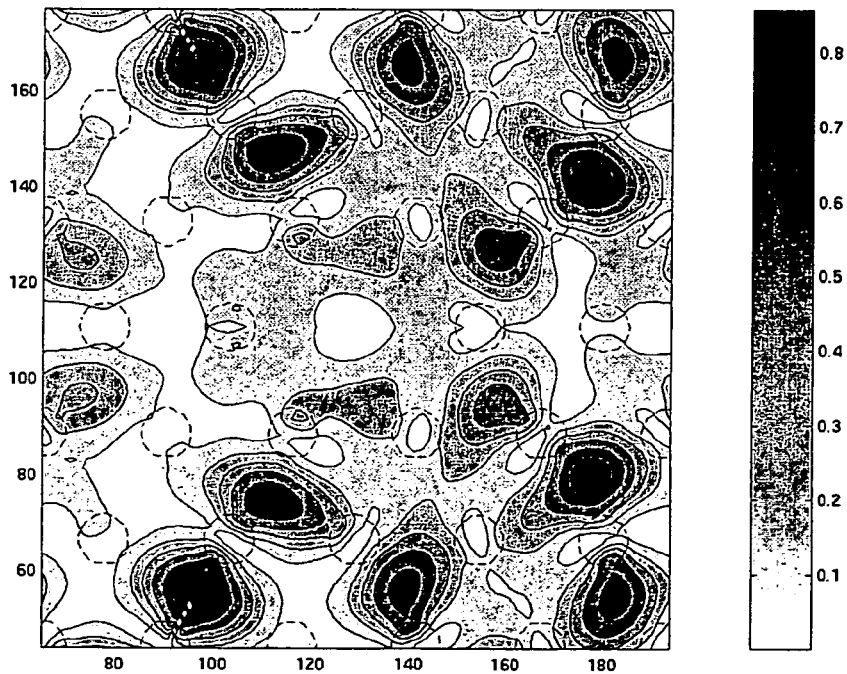
FIG. 9b shows the mode field distribution of a cladding mode positioned below the PBG.

As a further illustration of the properties of the new PBG fibre in FIG. 7, FIG. 9a shows the mode distribution of an allowed cladding mode at the same wavelength as the guided mode if FIG. 8. This cladding mode is positioned above the forbidden region within which the guided mode is found. Hence, this cladding mode has a larger propagation constant than the guided mode. Looking at FIG. 7, it is noticed that this cladding mode has an effective index above 1.45 and it is therefore expected that a significant fraction of its field distribution is within the high-index features—as confirmed by FIG. 9*a*. However, since this cladding mode is distributed all over the cladding (being an allowed cladding mode) it may not be efficiently guided through the fibre—unless as a cladding mode. For completeness, FIG. 9*b* shows the mode field distribution of a cladding mode positioned below the PBG. This cladding mode has an effective index of less than 1.45 and, as expected, it has spatial components in both the high-index features as well as in the background material.

Figure 10A:
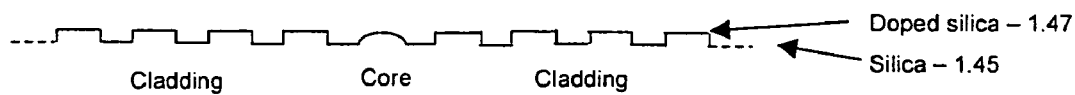
FIG. 10a shows schematically the refractive index profile along one cross-sectional direction of another PBG fibre according to the present invention. The core has a predetermined refractive index profile as exemplified by the six profiles shown in FIG. 10b.
Figure 10B:
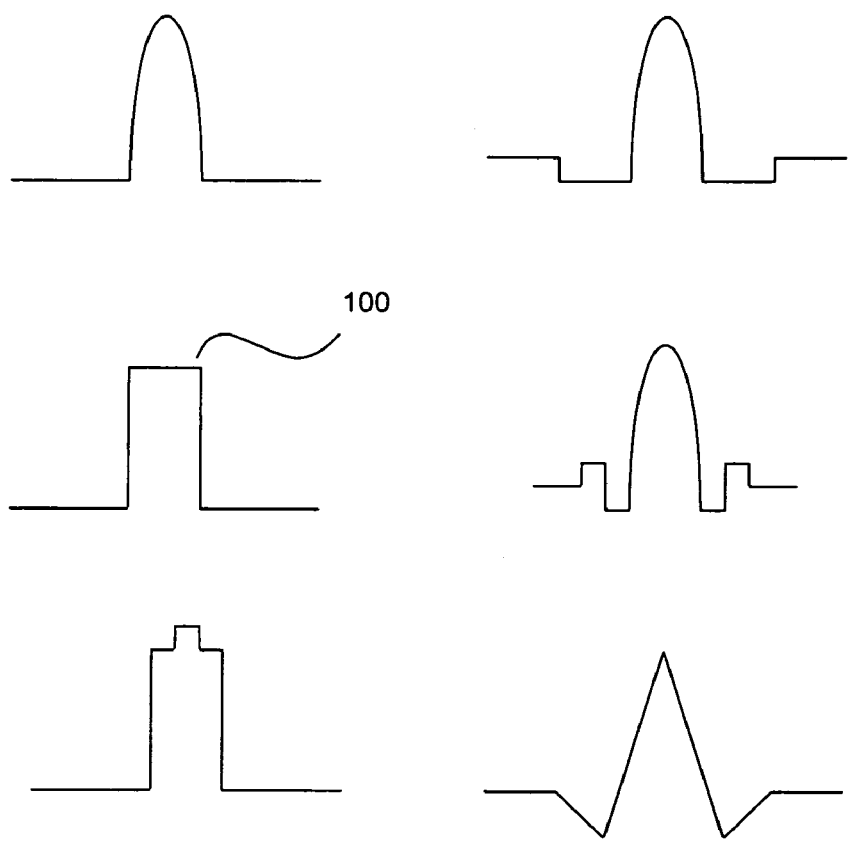

The here-disclosed PBG fibres may be fabricated using solely stacking of doped rods —and, replacing, for example, a single doped rod with a pure silica rod to form a low-index core. Hence, the here-disclosed high-index feature PBG fibre designs may be simpler to fabricate than prior art PBG fibres incorporating holes/voids in the cladding and in the core. Although step-index profiles of the cladding features were used for the above-analysed PBG fibre, it is also possible to use other refractive index profiles of the high-index features. FIG. 10*a* and FIG. 10*b* shows examples of refractive index profiles that may be employed for the final high-index features in the PBG fibres—as well as for one or more rods at the preform level. As shown in FIG. 10*a*, also the core may comprise various refractive index profiles, including the examples in FIG. 10*b*.

Figure 11:
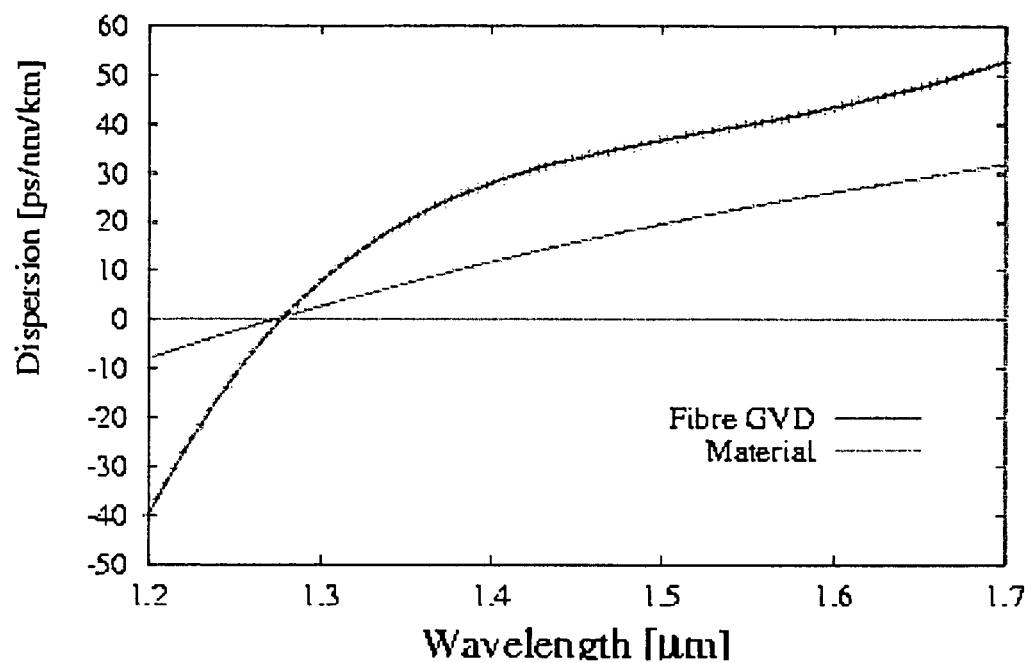
FIG. 11 schematically shows the dispersion properties at visible to near-infrared wavelength of a PBG fibre according to the present invention.

To examine some of the more advanced properties of PBG fibres according to the present invention, FIG. 11 illustrates the dispersion properties of the fibre in FIG. 7 for $\Lambda=8$ µm. The dispersion for this fibre is positive. The relatively large core of the fibre (of around 12.5 µm) makes this fibre potentially valuable for optical transmission of data at high bit rates. To improve the fibre, it may be desirable to tailor the dispersion of the fibre to provide a lower dispersion around 1.5 µm. The present inventors have realized that the properties of fibres according to the present inventor may be tailored by adjusting parameters such as the features size, refractive index profile, spacing, and periodic arrangement. The present inventors have further realized that the fibre properties may be further tailored by providing also a predetermined refractive index profiles to the core region, including providing spatially isolated features inside the core itself. As an example, providing a step index profile 100 as illustrated in FIG. 10*b* to the core may be utilized to obtain fibre properties as shown in FIG. 12 and FIG. 13*a*—showing the mode index and dispersion properties, respectively. As seen from FIG. 13*a*, this fibre has a reduced dispersion around 1.5 µm as desired. This fibre has $\Lambda=10$ µm—and therefore an even larger core size than the previously studied PBG fibre—and the core profile is a step profile 10 with the high-index part having a diameter of $0.8\Lambda$ and a refractive index of 1.46 (hence the core region retains a lower effective refractive index than the cladding features). Another example of dispersion properties that may be realised using a predetermined refractive index profile is shown in FIG. 13*b*—here the fibre may be utilized to provide negative dispersion around 1.5 µm—for example for dispersion compensation applications. The fibre of FIG. 13*b* has $\Lambda=12$ µm and a step profile with a diameter of $0.2\Lambda$ and a maximum refractive index of 1.47 (also this fibre retains a lower effective refractive index of the core region compared to the features in the cladding region).

It is valuable to look at other features sizes as well as other refractive index contrast. FIG. 14 shows PBGs exhibited by structures with the following characteristics; FIG. 14*a*: $d/\Lambda=0.2$, refractive index of the features, Nf, of 1.47, and FIG. 14*b*: $d/\Lambda=0.8$, Nf=1.47. For all these examples, it is found that the PBGs are exhibited for $\lambda$ shorter than $\Lambda$, in particular it is found that the PBGs are exhibited for $\lambda$ smaller than $0.5\Lambda$, such as $\lambda$ smaller than $0.2\Lambda$. The present inventors have also found similar PBGs for refractive index contrast from 1.45 to 1.46.

As for the case of the core refractive index profile, the cladding features may have various profiles as illustrated in FIG. 10*b*.

As a supplement to the description using PBG terminology, it may be valuable to understand the operation of the new PBG fibres, disclosed in the present application, by looking at three different wavelength regimes, and study the periodic cladding structure as formed from spatially isolated high-index features in a low-index background material:

Short wavelengths: The wavelength is significantly shorter than the diameter of the high-index features. The light will, therefore, be able to be completely confined within each high-index feature, and the features will consequently be completely isolated from each other with respect to light coupling. Hence, the mode(s) that is supported in a single high-index feature is identical to the mode(s) supported in all identical high-index features. The ensemble of high-index features supports a number of coupled modes with identical mode properties. This is seen as the complete coincidence of the high-index mode curves for short wavelengths—illustrating the modes supported by each individual high-index features—in the case of total isolation from the remainder of features.

Medium wavelengths: When the wavelength is increased, but still shorter than the diameter of the high-index features, the mode(s) supported in a single fibre will start to spread out, and eventually the modes of the high-index features will start to couple slightly to each other. In this regime, the mode(s) that is supported in a single high-index feature will, therefore, no longer be undisturbed from the modes in neighbouring high-index features. In this regime, the mode(s) in a single high-index features is slightly disturbed by the present of the remainder of high-index features and a spreading of the mode-curve is observed. The ensemble of high-index features now supports a number of modes with a slight variation of mode properties. As it can be seen from the figure, the periodic arrangement of the high-index features results in a forbidden region with a mode index below that of the background material. It is worth paying attention to the at-first-thought surprising result that forbidden region is positioned at mode indices where both the bulk high-index feature material and the bulk cladding background material support a large number of modes.

Long wavelengths: The wavelength is now so long that a strong coupling between the high-index features takes place—and the periodic structure is no longer capable of exhibiting forbidden regions. In this case, the wavelength is so long that the light may no longer resolve the spatially isolated high-index features.

The separation between the different regions is determined from the refractive index contrast as well as the filling fraction of the features.

With the above-stated considerations, the present inventors have realized that in order for the low index contrast structures comprising spatially isolated high-index features to exhibit PBG effect, then the wavelength of light guided through the fibre must be shorter than the spacing of the high-index features. If the refractive index contrast could be raised, this requirement would gradually be lifted—allowing PBGs to be exhibited for light of longer wavelengths. Finally, it should be mentioned that the effect of the filling fraction is such that increasing the filling fraction also pushes the long-wavelength limit of the exhibited PBGs towards longer wavelengths.

The present invention also includes PBG fibres for polarization maintaining applications, in particular the present invention allows to design PBG fibres with elliptical cladding features as well as cores with various shapes that may be of advantage for controlling polarization effects. An example of a PBG fibre with special polarization properties is shown in FIG. 15.

Also the present PBG fibres may incorporate various features in the core region in order to tailor the mode field distribution for example to improve coupling to conventional fibres.

The following description serves to present further examples of fibres according to the present invention for special applications, in particular for use in optical communication systems.

For optical communication systems, there is a general interest in broadband and high bit-rate operation. Typically, the system limits are being pushed using wide wavelength ranges over which transmission takes places, more optical channels, and faster bit rates at the individual channels. An important limiting factor of present optical communication systems is non-linear effects in the optical transmission fibre. In order to reduce non-linear effects, it is generally desired to provide single-mode optical transmission fibres that have a relatively large core size and a certain amount of dispersion. Presently employed transmission fibres have a core diameter of around 6 µm to 10 µm and a zero dispersion wavelength of around 1280 nm or higher. The zero dispersion of standard fibre are generally not shorter than 1280 nm and consequently, it is not feasible to use presently employed transmission fibres at wavelengths shorter than 1280 nm. Microstructured fibres are known from the prior art to exhibit relatively strong waveguide dispersion such that the fibre may exhibit zero dispersion wavelength shorter than 1280 nm. However, prior art microstructured fibres have been characterized by a relatively small core size in the case where the fibres exhibit relatively strong waveguide dispersion. The present inventors have realized that fibres according to the present invention exhibits strong waveguide dispersion that may be utilized to provide optical fibres with zero dispersion wavelength shorter than 1280 nm for relatively large core sizes. Such fibres may be used advantageously in numerous applications, including use as transmission fibres in optical communication systems (especially for broadband systems) and use as dispersion compensating fibres in systems comprising links with negative dispersion.

Looking first at the use of a fibre according to the present invention as broadband transmission fibre, FIG. 16 shows the operation of a fibre having a cladding background material of pure silica with a refractive index of 1.444 (material dispersion has been neglected for reasons of clarity in FIG. 16), high-index cladding features with d=0.45Λ and a maximum refractive index of 1.470, and a solid core region of material identical to the cladding background material. The high-index cladding features have a parabolic refractive index profile. The curves in the figure show the modes that are found for a simulation of the structure shown in the inset in the upper right corner of the figure (including cladding modes and the PBG mode). Although the PBG mode is not marked separately, it may be determined by comparison with the operation of the fibre in FIG. 7; the fibre in FIG. 16 exhibits a PBG guided mode in the range from around $\lambda/\Lambda=0.12$ to slightly above 0.45 (the long-wavelength cut-off of the PBG guided mode is not shown due to the cropping of the mode index axis). The horizontal line at mode index equal to 1.444 corresponds to the refractive index of cladding background material. For $\Lambda=6$ µm, the fibre exhibits a PBG guided mode in the range from around $\lambda=0.7$ µm to slightly above $\lambda=2.7$ µm (corresponding to the above-mentioned normalized wavelength range). The dispersion properties of the PBG guided mode is illustrated in FIG. 17 (for the calculation of the dispersion, the material dispersion of the fibre has been included). As seen from FIG. 17, the fibre exhibits a zero dispersion wavelength of around 1.1 µm—in contrast to standard optical fibres. The fibre is further characterized by a relatively large core size. Defining the core size as the minimum length of a straight line through the centre of the core to the edges of two high-index features placed on opposite sides of the core, the core size may for the design shown in the inset in FIG. 16 be found to be equal to 2Λ−d. Hence, the fibre with $\Lambda=6$ µm, and d=0.45Λ, has a core diameter of around 9.3 µm. In the prior art it is not known to have fibres with such a large core size in combination with such a low zero dispersion wavelength. Such a fibre, in particular in an all-silica configuration that may provide low losses, are highly attractive for transmission of high bit-rates at wavelengths from around 1.2 µm to 1.7 µm.

It is important to notice that the high-index features in the cladding provide an additional mean for tuning, trimming, or tailoring the waveguiding properties of fibres according to the present invention, including dispersion, polarization, and cut-off properties. This is possible though changing the refractive index of the cladding high-index features and thereby the waveguiding properties. An example of tuning the waveguiding properties of PBG fibres with high-index cladding features have for example been demonstrated recently by Bise et al. in Optical Fiber Communication Conference, paper ThK3, 2002. The index change may for example be changed by temperature influence, as demonstrated by Bise et al. The present inventors have realized that other means for tuning the fibre properties are feasible through the use of the high-index cladding features as individual waveguides or as coupled waveguides—preferably at one or more wavelengths shorter than the operational wavelength (at which light is guided through the core). As an example the cladding features may change their refractive index through the use of non-linear optical effects, thereby providing means for ultra-fast tuning of the waveguiding properties. Non-linear optical effects are generally significantly faster than temperature-induced effects. The non-linear optical effects, may for example be obtained be use of side-illumination of the fibre (at one or more places along the fibre), or the tuning light (control-signal) may be coupled to the cladding features at one or both ends of the fibre using for example a fibre that has been spliced to the PBG fibre. An appropriate fibre for this purpose may for example be a fibre comprising any standard core profile and an outer ring-shaped core. The signal to the PBG fibre according to the present invention may thus be coupled in or out using the standard core and the outer ring-shaped core may provide the control-signal to tune or trim the waveguiding properties. Alternatively, the fibre that is spliced on may guide both the signal and the control-signal in its core, where the signal is supported by the PBG fibre, and the control-signal is at a wavelength that is outside the PBG range of the PBG fibre—hence, the control-signal will quickly leak to the high-index cladding features and thereby allow the tuning.

Other types of in-coupling may naturally be thought of as well as other types of designs for the fibre(s) that is spliced to the PBG fibre. Alternatively, the control-signal may be applied to only a limited number of the high-index cladding features—for example in the case of tuning polarization properties of the fibre. In this manner birefringence in the fibre, which may have been introduced due structural variation during fibre fabrication, may be counteracted through trimming of the refractive index of one or more cladding features individually. Using the above-described ideas and concepts, the present invention also provides optical fibre with tuneable dispersion or with tuneable polarization, such as for example tuneable dispersion compensating fibres and fibres for polarization mode dispersion compensation.

FIG. 18 shows the operation of a fibre according to the present invention that has a higher contrast between the refractive index of the cladding background material and the maximum refractive index of the high-index cladding features compared to the fibre in FIGS. 16 and 17. The fibre has cladding index features with a refractive index profile as shown in the lower figure of FIG. 18 (FIG. 18b). The fibre has a similar design as the fibre in FIG. 16, but with d=0.64Λ, and a maximum refractive index that is 3% larger than the refractive index of the cladding background material—an index contrast that may be realized using silica doping techniques. FIG. 19, upper figure (FIG. 19a), shows the dispersion properties of the PBG guided mode. As seen from the figure, the fibre with Λ=3 μm exhibits a relatively strong anomalous dispersion of more than 200 ps/nm/km in the wavelength range from around 1.3 μm to 1.7 μm. This fibre has a core diameter of around 2Λ−d=4 μm. This core diameter is about twice the size of the fibre for dispersion control in optical communication systems that is disclosed in EP1148360 having anomalous dispersion of around 200 ps/nm/km at a wavelength around 1.5 μm (see lower figure (FIG. 19b) in FIG. 19 that is reproduced from EP1148360). Hence, the fibre according to the present invention provides a technical advantage in terms of a large core size of the dispersion controlling fibre thereby allowing reduction on non-linear effects at the signal wavelength and consequently higher bit rates of the optical communication systems. For even larger core sizes, such as a core diameter of around 5.4 μm (Λ=4 μm), the PBG fibre in FIG. 19 exhibits relatively large anomalous dispersion of more than 100 ps/nm/km from λaround 1.3 μm to λabove 1.7 μm. Hence, also for this large core size the fibre is suitable for dispersion control.

FIG. 20 shows an example of a fibre according to the present invention, where the core region has a predetermined refractive index profile to further control the waveguiding properties, such as for example dispersion. The core comprises a feature having a higher refractive index than the cladding background material and equal to the highest refractive index of the cladding features. The profile of the core is in this example a step-index profile, as shown in FIG. 20, lower figure (FIG. 20b). The operation of the fibre is shown in the upper figure (FIG. 20a) of FIG. 20 for the fibre having cladding features of diameter, d=0.7Λ and core features of diameter, $d_{core}$=0.5Λ (the smaller core feature compared to the cladding features provides a lower effective refractive index of the core than the cladding). The operation shows that the fibre guides a PBG mode from a wavelength of around λ/Λ=0.08 to λ/Λ around 0.5. The effective mode index of the PBG guided mode varies within this wavelength range from around 1.455 to around 1.420. Hence, the mode index may be higher than the refractive index of the cladding background material at certain wavelength, but the mode index of the PBG guided mode remains lower than the effective refractive index of the cladding (upper mode curve). Due to the relatively low λ/Λ ratio, the fibre may be scaled to a relatively large Λ for a given wavelength. FIG. 21 shows examples of the dispersion properties of the fibre in FIG. 18 for Λ=9 to 11 μm.

In a further embodiment the fibre may be used for efficient so-called third harmonic generation of powerful light pulses. Third harmonic generation can result if the modal index of the wavelength $$\frac{1}{3}\lambda$$

is equal to the modal index at λ. The wavelength of light may then be shifted from λ to $$\frac{1}{3}\lambda.$$

. In traditional optical fibres third harmonic generation can only be an inefficient process, since the overlap is between modes with non-equal order (e.g. between a fundamental and a second order mode). The present invention, however, allows for third harmonic generation between e.g. two fundamental modes with good modal overlap, and therefore allows much more efficient third harmonic generation. This is made possible by the multiple photonic bandgaps of the fibre structure separated only by the very narrow intervals where cladding modes exist. In other words third harmonic generation should be for a modal index near the background refractive index of the cladding structure. Third harmonic generation is consequently a possibility for fibres with a core-region with a refractive index near equal to or slightly above the refractive index of the background material of the cladding region. In such fibres one may obtain that the guided fundamental mode traverses the different adjacent photonic bandgap with an almost constant modal index.

In order to fabricate fibres according to the present invention, methods well known for fabrication of microstructured fibres or fibres with multiple cores may be employed with modification feasible for a person skilled in the art of fabricating microstructured fibres —see for example Patent Abstracts of Japan, appl. no. 06250491; Patent Abstracts of Japan, appl. no. 58090313; Patent Abstracts of Japan, appl. no. 55117209; Patent Abstracts of Japan, appl. no. 54081518; U.S. Pat. No. 5,155,792; WO 0226648, U.S. Pat. No. 5,471,553. A number of these methods are based on stacking of rods or canes to form a preform and drawing this into fibre using a conventional drawing tower. An example of a preform for a fibre according to the present invention is illustrated in FIG. 22. The preform comprises a pure silica rod 220 that will form the core. This rod is surrounded by a number of silica rods 221 comprising a Ge-doped inner part 222 that will form the 2D periodic structure of the inner cladding region. The stack of rods is placed in an overcladding tube 223. The preform may further comprise various types of filling/stuffing/buffer elements, such as for example rods 224. The overcladding tube usually acts as an outer cladding region providing a desired outer diameter of the final fibre as well as mechanical robustness of the fibre. Other types of outer claddings are also covered by the present invention, such as outer claddings comprising an air-clad layer and a solid part—as for example described by in U.S. Pat. No. 5,907,652 (see also this reference for further information on drawing optical fibres with microstructured features). During fibre drawing, a lower than atmospheric pressure may be apply inside the overcladding tube in order for the small interstitial voids between the rods to collapse. In this manner, the rods will form a close packed, 2D periodic arrangement. The preform in FIG. 22 comprises a relatively low number of periods surrounding the core (corresponding to five layers). Preferably, a larger number of layers is employed in order to reduce various loss mechanisms. The preform may preferably be processed prior to fibre drawing where the preform is for example placed in a lathe and heated to a temperature such that the overcladding tube collapses and fixates the rods. The method of stacking rods may also be applied, using appropriate modifications, to other material systems, such as for example polymers.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A micro-structured optical fibre for guiding light at an operating wavelength, said optical fibre having an axial direction and a cross section perpendicular to said axial direction, said optical fibre comprising:
   a core region; and
   a cladding region surrounding said core region, said cladding region comprising a low-index cladding background material with, in the crosssection, periodically arranged spaced apart high-index cladding features having a higher refractive index than the refractive index of the cladding background material, with a centre-to-centre spacing of nearest cladding features being larger than said operating wavelength.

2. The micro-structured optical fibre according to claim 1 wherein the core region exhibits an effective refractive index which is lower than the refractive index of the high-index cladding features at the operating wavelength.

3. The microstructured optical fibre according to claim 1 wherein the high-index cladding features comprise doped silica.

4. The microstructured optical fibre according to claim 1 wherein said core region is solid.

5. The microstructured optical fibre according to claim 4 wherein the core region has a predetermined refractive index profile.

6. The micro-structured optical fibre according to claim 1 wherein said core region is homogeneous.

7. The microstructured optical fibre according to claim 1 wherein the core region is made of a solid material identical to the cladding background material.

8. The micro-structured optical fibre according to claim 1 wherein the optical fibre is dimensioned to guide light at a predetermined wavelength.

9. A micro-structured optical fibre according to claim 1 wherein the core region comprises a material having a refractive index being lower than the refractive index of the high-index cladding features and higher than or equal to the refractive index of the low-index cladding background material.

10. The micro-structured optical fibre according to claim 1 wherein the core region comprises spatially isolated features.

11. The micro-structured optical fibre according to claim 1 wherein said high-index cladding features are elongated in the fibre axial direction.

12. The micro-structured optical fibre according to claim 1 wherein the core region has an effective refractive index being lower than an effective refractive index of the cladding region at an operating wavelength of guided light.

13. The micro-structured optical fibre according to claim 1 wherein the optical fibre is a Photonic Bandgap Fibre.

14. The micro-structured optical fibre according to claim 1 wherein the fabrication of the fibre comprises stacking of doped silica rods.

15. The micro-structured optical fibre according to claim 1 wherein the fabrication of the fibre comprises stacking of doped silica rods and at least one pure silica rod.

16. The micro-structure optical fibre according to claim 1 wherein the difference in the refractive index of the high index cladding features and the low-index cladding background material is equal to or lower than 5% of the refractive index of the high-index cladding features.

17. The micro-structured optical fibre according to claim 1 wherein the fibre solely comprises materials having refractive indices in the range from 1.43 to 1.48.

18. The micro-structured optical fibre according to claim 1 wherein a centre-to-centre spacing of said nearest cladding features is larger than twice said operating wavelength.

19. The micro-structured optical fibre according to claim 1 wherein said operating wavelength of guided light is selected from wavelengths in the interval of 0.3 µm to 2 µm.

20. The micro-structured optical fibre according to claim 1 wherein said operating wavelength of guided light is selected from wavelengths in the interval of 0.6 µm to 1.2 µm.

21. The micro-structured optical fibre according to claim 1 wherein said operating wavelength of guided light is selected to be about 0.78 µm, about 0.98 µm, or about 1.06 µm.

22. The micro-structured optical fibre according to claim 1 wherein said operating wavelength of guided light is selected from wavelengths in the interval of 1.2 µm to 1.6 µm.

23. The micro-structured optical fibre according to claim 1 wherein said operating wavelength of guided light is selected to be about 1.3 µm.

24. The micro-structured optical fibre according to claim 1 wherein said operating wavelength of guided light is selected from wavelengths in the interval of 1.5 µm to 1.6 µm.

25. The micro-structured optical fibre according to claim 1 wherein said operating wavelength of guided light is selected to be about 1.55 µm.

26. The micro-structured optical fibre according to claim 1 wherein said optical fibre is dimensioned to transmit light of said operating wavelength in a single mode of propagation.

27. The micro-structured optical fibre according to claim 1 wherein the optical fibre is dimensioned to transmit light in a single mode of propagation for a range of wavelengths below said operating wavelength.

28. The micro-structured optical fibre according to claim 27 wherein said range of wavelengths includes wavelengths down to 0.3 µm.

29. The micro-structured optical fibre according to claim 1 wherein at least 20% of the cladding features have a cross-sectional dimension perpendicular to said axial direction being larger than the wavelength of light guided by said fibre.

30. The micro-structured optical fibre according to claim 1 wherein the core region has a diameter larger than or equal to 2 μm.

31. The micro-structured optical fibre according to claim 29 wherein the core region has a diameter in the range of 2-50 μm.

32. The micro-structured optical fibre according to claim 1 wherein the core material and/or the first cladding material is silica.

33. The micro-structured optical fibre according to claim 1 wherein the cladding features in the cross-section have a non-circular shape.

34. The micro-structured optical fibre according to claim 1 wherein any of the core features are voids containing polymer(s), a material providing an increased third-order non-linearity, a photo-sensitive material, or a rare earth material.

35. The micro-structured optical fibre according to claim 1 wherein any of the cladding features are voids containing polymer(s), a material providing an increased third-order non-linearity, a photo-sensitive material, or a rare earth material.

36. The micro-structured optical fibre according to claim 1 wherein the core and/or the cladding comprises a material selected from the group consisting of materials containing polymer(s), material(s) providing an increased third-order non-linearity, photo-sensitive material(s), and rare earth material(s).

37. The micro-structured optical fibre according to claim 1 wherein said fibre is dimensioned to guide light of the predetermined or operating wavelength in two substantially, non-degenerate polarization states.

38. The micro-structured optical fibre according to claim 1 wherein the shape of the core region deviates substantially from a circular shape in the fibre cross-section.

39. The micro-structured optical fibre according to claim 1 wherein the shape of the core region is substantially rectangular in the fibre cross-section.

40. The micro-structured optical fibre according to claim 1 wherein the core region and/or cladding region has substantially a 180 degree rotational symmetry in the fibre cross-section.

41. The micro-structured optical fibre according to claim 1 wherein said core and cladding region are mutually adapted so that the fibre exhibits large anomalous dispersion of more than 100 ps/nm/km at a wavelength in the range from 1.4 μm to 1.7 μm, said core region having a diameter of more than 4 μm.

42. The micro-structured optical fibre according to claim 1 wherein said core and cladding region are mutually adapted so that the fibre exhibits large anomalous dispersion of more than 200 ps/nm/km at a wavelength in the range from 1.3 μm to 1.7 μm, said core region having a diameter of more than 2 micrometer.

43. A micro-structured optical fibre according to claim 1 wherein said core and cladding region being mutually adapted so that the fibre exhibits anomalous dispersion over a wavelength range from at least 1.2 μm to 1.7 μm.

44. A fibre optical communication system of part thereof, wherein a micro-structured optical fibre according to claim 1 is employed for dispersion control.

45. A fibre optical communication system of part thereof, wherein a micro-structured optical fibre according to claim 1 is employed as transmission path.

* * * * *